United States Patent
Liu et al.

(10) Patent No.: US 11,696,294 B2
(45) Date of Patent: Jul. 4, 2023

(54) METHOD AND DEVICE FOR DETERMINING AND DETECTING TIME DOMAIN RESOURCE, STORAGE MEDIUM, AND ELECTRONIC DEVICE

(71) Applicant: ZTE CORPORATION, Guangdong (CN)

(72) Inventors: Xing Liu, Shenzhen (CN); Peng Hao, Shenzhen (CN); Yachao Liang, Shenzhen (CN); Feng Bi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 93 days.

(21) Appl. No.: 17/062,064

(22) Filed: Oct. 2, 2020

(65) Prior Publication Data

US 2021/0153174 A1     May 20, 2021

Related U.S. Application Data

(63) Continuation of application No. PCT/CN2019/081490, filed on Apr. 4, 2019.

(30) Foreign Application Priority Data

Apr. 4, 2018   (CN) .......................... 201810301332.1

(51) Int. Cl.
*H04W 72/04* (2009.01)
*H04J 3/16* (2006.01)
*H04W 72/044* (2023.01)

(52) U.S. Cl.
CPC ......... *H04W 72/042* (2013.01); *H04J 3/1694* (2013.01); *H04W 72/044* (2013.01)

(58) Field of Classification Search
CPC ............ H04W 72/042; H04W 72/044; H04W 72/0446; H04J 3/1694; H04L 5/0053; H04L 5/0007; H04L 5/0028; H04L 5/0083

See application file for complete search history.

(56) References Cited

U.S. PATENT DOCUMENTS

| | | | |
|---|---|---|---|
| 10,848,363 B2 * | 11/2020 | Akkarakaran | ...... H04L 27/2657 |
| 2014/0286255 A1 * | 9/2014 | Nam | .................... H04L 27/2613 370/329 |

(Continued)

FOREIGN PATENT DOCUMENTS

| CN | 103944665 A | 7/2014 |
|---|---|---|
| CN | 104125186 A | 10/2014 |

(Continued)

OTHER PUBLICATIONS

Extended European Search Report for EP Appl. No.19781069.9, dated May 6, 2021 (7 pages).

(Continued)

*Primary Examiner* — John D Blanton
(74) *Attorney, Agent, or Firm* — Foley & Lardner LLP

(57) ABSTRACT

Provided are time domain resource determination and detection methods and apparatuses, a storage medium and an electronic device. The method includes determining a time domain resource allocation pattern set. The time domain resource allocation pattern set includes at least one of a time domain resource allocation pattern set corresponding to a combination of a first subcarrier spacing (SCS) and a second SCS, where the first SCS is an SCS of a first channel signal, and the second SCS is an SCS of a second channel signal; a time domain resource allocation pattern set indicated by downlink control information (DCI) signaling; or a time domain resource allocation pattern set corresponding to a slot type. A time domain resource allocation pattern in the (Continued)

time domain resource allocation pattern set is used to indicate symbols occupied by the second channel signal.

15 Claims, 4 Drawing Sheets

(56) References Cited

U.S. PATENT DOCUMENTS

| | | |
|---|---|---|
| 2016/0295565 A1 | 10/2016 | Kim et al. |
| 2017/0295601 A1 | 10/2017 | Kim et al. |
| 2019/0132170 A1* | 5/2019 | Si .................. H04L 27/26025 |

FOREIGN PATENT DOCUMENTS

| | | |
|---|---|---|
| WO | WO-2014/110928 A1 | 7/2014 |
| WO | WO-2015/178630 A1 | 11/2015 |
| WO | WO-2017/036385 A1 | 3/2017 |
| WO | WO-2017/045571 A1 | 3/2017 |
| WO | WO-2017/133709 A1 | 8/2017 |
| WO | WO-2017/196042 A1 | 11/2017 |
| WO | WO-2017/217748 A1 | 12/2017 |
| WO | WO-2018/014191 A1 | 1/2018 |
| WO | WO-2018/043960 A1 | 3/2018 |

OTHER PUBLICATIONS

International Search Report and Written Opinion for PCT Appl. No. PCT/CN2019/081490 dated Jul. 3, 2019 (with English translation, 13 pages).
Zte et al.: "Remaining Details of RMSI" 3GPP TSG RAN WG1 Meeting #92bis RI-1803608, Apr. 6, 2018 (Apr. 6, 2018), Sanya, China (23 pages).
Examination Report for IN Appl. No. 202027041449, dated Aug. 12, 2022 (6 pages).
Fraunhofer Iis, "Time and Frequency Domain Resource Allocation with K Repetitions" 3GPP TSG-RAN WG1 Meeting #91, R1-1720991, Dec. 1, 2017, Reno, USA (7 pages).
Notification to Complete Formalities of Registration for CN Appl. No. 202110587553.1, dated Jun. 24, 2022 (with English translation, 7 pages).
First Office Action for JP Appl. No. 2020-554196, dated Apr. 11, 2023 (with English translation, 11 pages).
Nokia et al., "Corrections to resource allocation" 3GPP TSG RAN WG1 Meeting #92, R1-1802794, Mar. 2, 2018, Athens, Greece (11 pages).
Vivo, "Discussion on Remaining Minimum System Information", 3GPP TSG RAN WG1 Meeting#92, R1-1801508, Mar. 2, 2018, Greece, Athens (8 pages).

* cited by examiner

METHOD AND DEVICE FOR DETERMINING AND DETECTING TIME DOMAIN RESOURCE, STORAGE MEDIUM, AND ELECTRONIC DEVICE

CROSS-REFERENCE TO RELATED APPLICATIONS

This application claims the benefit of priority under 35 U.S.C. § 120 as a continuation of PCT Patent Application No. PCT/CN2019/081490, filed on Apr. 4, 2019, which claims priority to Chinese patent application no. 201810301332.1, filed on Apr. 4, 2018. The entire content of each of which is incorporated herein by reference.

TECHNICAL FIELD

The present disclosure relates to the field of communications and, specifically, to time domain resource determination and detection methods and apparatuses, a storage medium and an electronic device.

BACKGROUND

In the related art, communications are performed by a carrier frequency, such as 28 GHz or 45 GHz, that is higher than a carrier frequency used in a 4th generation (4G) mobile communication system. This high-frequency channel has disadvantages of large free propagation loss, easy absorption by oxygen, and great impact by rain attenuation, which seriously affect the coverage performance of a high-frequency communication system. To ensure that a high-frequency communication and a long term evolution (LTE) system have similar SINR within a coverage range, it is necessary to ensure antenna gains of the high-frequency communication. Fortunately, a carrier frequency of the high frequency communication has a shorter wavelength, ensuring that more antenna elements can be accommodated in per unit area. The more antenna elements mean that a beamforming method may be used to improve the antenna gains so as to ensure the coverage performance of the high frequency communication.

Using the beamforming method, a transmitting end may concentrate transmitting energy in one direction, while the transmitting energy is small or free in other directions. That is, each beam has its own directivity and may only cover terminals in a certain direction, and the transmitting end, that is, a base station, needs to transmit multiple beams to implement full coverage. Typically, the number of beams ranges from tens to hundreds. To meet access requirements of terminals in various directions, it is necessary to implement all-directional coverage of system broadcast messages. A communication station needs to repeatedly send the same system broadcast message in various beam directions. For the communication station, the "absolute overheads" of system broadcast messages also becomes larger.

In a new radio (NR) communication system, system information is divided into minimum system information (minimum SI) and other system information (OSI). The minimum system information is further divided into master information block (MIB) carried by a physical broadcast channel (PBCH) and remaining minimum system information (RMSI) carried by a physical downlink shared channel (PDSCH). The RMSI is carried by the PDSCH and scheduled by a corresponding physical downlink control channel (PDCCH). The MIB is used for providing a basic system parameter of a cell. The remaining minimum system information is used for providing configuration information related to initial access, such as sending configuration of a initial access request, and receiving configuration of a initial access response message. Other system information that needs to be broadcasted is referred to as other system information. RMSI transmission is as shown in FIG. 1. FIG. 1 is a schematic diagram of RMSI transmission according to the related art of the present disclosure. Time division multiplexing or frequency division multiplexing between the RMSI and a synchronization signal physical broadcast channel block (SS/PBCH block, SSB) is supported in the standards.

In view of the mode of time division multiplexing, FIG. 2 is a schematic diagram of time division multiplexing transmission for RMSI according to the related art of the present disclosure. As shown in FIG. 2, during the RMSI transmission, the RMSI transmission may overlap with the transmission for the synchronous signal block, and the two may even be mapped in the same slot. As regards RMSI PDSCH reception, when it is specified in the current standard that a terminal receives the PDSCH according to an indication in RMSI PDCCH resource allocation, it is not regarded that the PDSCH contains a resource for SSB transmission. This does not mean that the RMSI transmission has a higher priority than the SSB transmission, but rather a limit for the base to consider a resource occupied by the SSB when the base station allocates an RMSI resource and avoiding scheduling an RMSI PDSCH onto the resource occupied by the SSB. The terminal cannot know actual transmission location information of the SSB when the RMSI is received, therefore, in a case where the RMSI resource overlaps the SSB resource, the terminal cannot implement rate matching based RMSI PDSCH reception according to the location of the SSB resource.

In the time domain resource allocation according to the related art, the PDSCH is only supported to occupy several consecutive symbols in a slot. As regards the RMSI transmission, in view of the preceding particularity, the resource allocation for the RMSI PDSCH is greatly limited in a case where the SSB occupies a middle symbol of a certain slot, and even the RMSI PDSCH transmission cannot be implemented in the certain slot. It can be seen that the time domain resource allocation in the related art is not applicable to the RMSI.

In view of the preceding problem in the related art, no effective solution has yet been proposed.

SUMMARY

Embodiments of the present disclosure provides time domain resource determination and detection methods and apparatuses, a storage medium and an electronic device.

An embodiment of the present disclosure provides a time domain resource determination method. The method includes determining a time domain resource allocation pattern set. The time domain resource allocation pattern set includes at least one of a time domain resource allocation pattern set corresponding to a combination of a first subcarrier spacing (SCS) and a second SCS, where the first SCS is an SCS of a first channel signal, and the second SCS is an SCS of a second channel signal; a time domain resource allocation pattern set indicated by downlink control information (DCI) signaling; or a time domain resource allocation pattern set corresponding to a slot type. A time domain resource allocation pattern in the time domain resource allocation pattern set is used to indicate symbols occupied by the second channel signal.

An embodiment of the present disclosure provides a time domain resource determination method. The method includes determining a time domain resource allocation pattern set according to at least one of a combination of a first subcarrier spacing (SCS) and a second SCS, an indication of downlink control information (DCI) signaling, or a slot type; and determining, according to a time domain resource allocation pattern in the time domain resource allocation pattern set, symbols occupied by a second channel signal. The second SCS refers to an SCS of the second channel signal.

An embodiment of the present disclosure provides a time domain resource detection method. The method includes that a terminal detects downlink control information of a second channel signal in one or more slots within a monitoring window corresponding to the second channel signal.

Another embodiment of the present disclosure provides a time domain resource determination apparatus. The apparatus includes a determination module. The determination module is configured to determine a time domain resource allocation pattern set. The time domain resource allocation pattern set includes at least one of a time domain resource allocation pattern set corresponding to a combination of a first subcarrier spacing (SCS) and a second SCS, where the first SCS is an SCS of a first channel signal, and the second SCS is an SCS of a second channel signal; a time domain resource allocation pattern set indicated by downlink control information (DCI) signaling; or a time domain resource allocation pattern set corresponding to a slot type. A time domain resource allocation pattern in the time domain resource allocation pattern set is used to indicate symbols occupied by the second channel signal.

Another embodiment of the present disclosure provides a time domain resource determination apparatus. The apparatus includes a first determination module and a second determination module. The first determination module is configured to determine a time domain resource allocation pattern set according to at least one of a combination of a first subcarrier spacing (SCS) and a second SCS, an indication of downlink control information (DCI) signaling, or a slot type. The second determination module is configured to determine, according to a time domain resource allocation pattern in the time domain resource allocation pattern set, symbols occupied by a second channel signal, where the second SCS refers to an SCS of the second channel signal.

Another embodiment of the present disclosure provides a time domain resource detection apparatus. The apparatus includes a detection module. The detection module is configured to detect downlink control information of a second channel signal in one or more slots within a monitoring window corresponding to the second channel signal.

Another embodiment of the present disclosure further provides a storage medium. The storage medium stores a computer program. The steps of any method embodiment described above are performed when the computer program is executed.

Another embodiment of the present disclosure further provides an electronic device. The device includes a memory and a processor. The memory stores a computer program. The processor is configured to execute the computer program to perform the steps of any method embodiment described above.

Through the present disclosure, the technical problem in the related art that only the second channel signal is supported to be transmitted on several consecutive symbols in a slot is solved, resource allocation limit is avoided and the efficiency and the flexibility of the resource allocation is improved.

BRIEF DESCRIPTION OF DRAWINGS

The drawings described herein are used to provide a further understanding of the present disclosure and form a part of the present application. The illustrative embodiments and descriptions thereof in the present disclosure are used to explain the present disclosure and not to limit the present disclosure in any improper way. In the drawings.

DETAILED DESCRIPTION

The present disclosure is described hereinafter in detail with reference to the drawings in conjunction with embodiments. It is to be noted that if not in collision, the embodiments and features therein in the present disclosure may be combined with each other.

It is to be noted that the terms "first", "second" and the like in the description, claims and drawings of the present disclosure are used to distinguish between similar objects and are not used to describe a particular order or sequence.

Embodiment One

Figure 1:
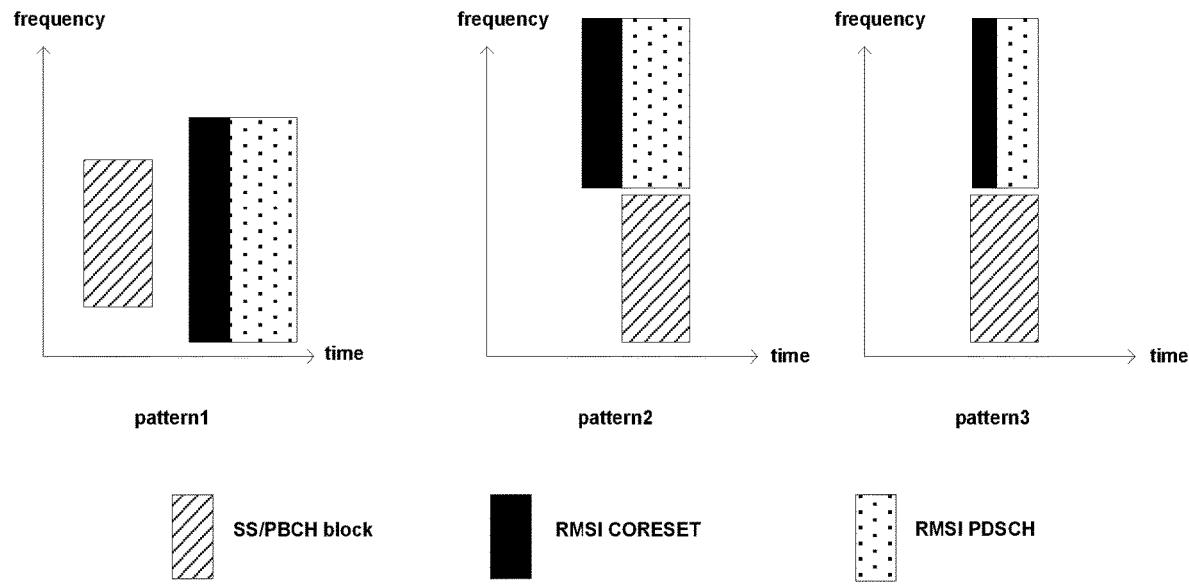
FIG. 1 is a schematic diagram of RMSI transmission according to the related art.
Figure 2:
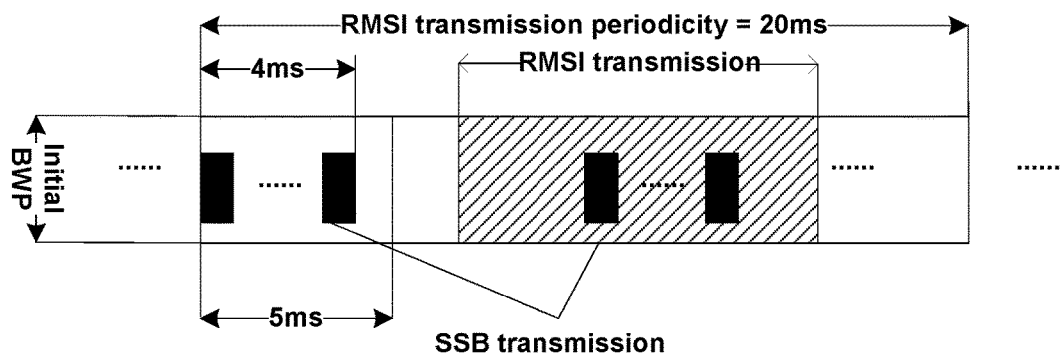
FIG. 2 is a schematic diagram of time division multiplexing transmission for RMSI according to the related art of the present disclosure.
Figure 3:
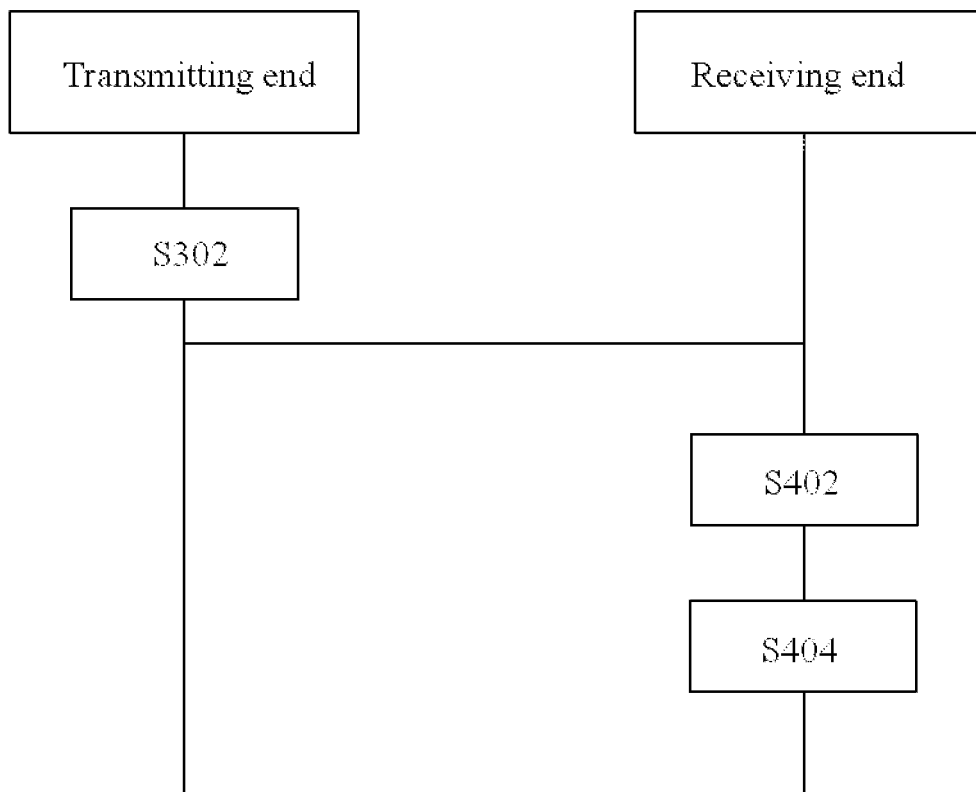
FIG. 3 is a flowchart of a time domain resource determination method according to an embodiment of the present disclosure.

This embodiment provides a time domain resource determination method. FIG. 3 is a flowchart of a time domain resource determination method according to an embodiment of the present disclosure. As shown in FIG. 3, at a transmitting end, the method includes the steps described below.

In step S302, a time domain resource allocation pattern set is determined. The time domain resource allocation pattern set includes at least one of a time domain resource allocation pattern set corresponding to a combination of a first subcarrier spacing (SCS) and a second SCS, where the first SCS is an SCS of a first channel signal, and the second SCS is an SCS of a second channel signal; a time domain resource allocation pattern set indicated by downlink control information (DCI) signaling; or a time domain resource allocation pattern set corresponding to a slot type. A time domain resource allocation pattern in the time domain resource allocation pattern set is used to indicate symbols occupied by the second channel signal.

Another time domain resource determination method is provided in the embodiment. As shown in FIG. 3, at a receiving end, the method further includes the steps described below.

In step S402, a time domain resource allocation pattern set is determined according to at least one of a combination of a first subcarrier spacing (SCS) and a second SCS, an indication of downlink control information (DCI) signaling, or a slot type.

In step S404, symbols occupied by a second channel signal are determined according to a time domain resource allocation pattern in the time domain resource allocation pattern set.

Through the preceding steps, a time domain resource for the second channel signal in a slot is allocated, and thus the first channel signal and the second channel signal can be transmitted in the slot corresponding to the second SCS. Therefore, the technical problem in the related art that only the second channel signal is supported to be transmitted on several consecutive symbols in the slot is solved, resource allocation limit is avoided and the efficiency and the flexibility of the resource allocation is improved.

Optionally, performing agents of the preceding steps are such that: the transmitting end may be a network element at a network side, such as a base station or a server, and the receiving end may be, but is not limited to, a terminal.

Optionally, the step of determining the time domain resource allocation pattern set corresponding to the combination of the first SCS and the second SCS includes defining a correspondence between the time domain resource allocation pattern set and the combination of the first SCS and the second SCS, and determining, according to the correspondence, the time domain resource allocation pattern set used by the combination of the first SCS and the second SCS.

Optionally, in the case where the time domain resource allocation pattern set indicated by the DCI signaling, the time domain resource allocation pattern set includes at least one of a set of consecutive time domain resource allocation patterns, a set of disconsecutive time domain resource allocation patterns, a time domain resource allocation pattern set in a case where a slot contains the first channel signal; or a time domain resource allocation pattern set in a case where a slot contains no first channel signal.

Optionally, the slot type includes a slot containing a transmission resource for the first channel signal, and a slot containing no transmission resource for the first channel signal.

Optionally, the method further includes indicating the time domain resource allocation pattern in the time domain resource allocation pattern set by the DCI signaling.

Optionally, the symbols occupied by the second channel signal include preceding M symbols and following N symbols of a time domain resource occupied by the first channel signal. M and N are integers greater than or equal to 0 and M+N<14. (14−M+N) symbols in the middle are symbols of the time domain resource occupied by the first channel signal.

Optionally, among the symbols occupied by the second channel signal, an interval between two adjacent groups of consecutive symbols is an integer multiple of the number of symbols of the first channel signal.

Optionally, the symbols occupied by the second channel signal include consecutive P symbols. P is an integer satisfying $0 < P \leq 14$.

Optionally, a time domain resource other than the symbols occupied by the second channel signal corresponds to at least one of: one or more mapping patterns for the first channel signal, a mapping pattern for a physical downlink control channel, or a mapping pattern for a guard period and a physical uplink control channel.

Optionally, the symbols occupied by the second channel signal includes at least one of symbols preceding the downlink control information, symbols for the downlink control information, or symbols following the downlink control information.

Optionally, the first channel signal refers to a synchronization signal physical broadcast channel block (SSB); and the second channel signal includes at least one of a physical downlink shared channel (PDSCH) carrying remaining minimum system information (RMSI), a PDSCH carrying paging information, a PDSCH carrying other system information (OSI), a PDSCH carrying random access response information, a PDSCH carrying random access collision resolution information, a PDSCH carrying message 2 (MSG2), or a PDSCH carrying message 4 (MSG4).

In the embodiment, the combination of the first SCS and the second SCS includes at least one of {15, 15} kHz, {15, 30} kHz, {30, 15} kHz, {30, 30} kHz, {120, 60} kHz, {120, 120} kHz, {240, 60} kHz, or {240, 120} kHz.

For a scenario of various combinations, examples are described below.

In a case where the combination of the first SCS and the second SCS is {15, 15} kHz, the time domain resource allocation pattern set includes one or more of the following time domain resource allocation patterns: symbols 0, 1, 4, 5, 6 and 7; symbols 0, 1, 4, 5, 6, 7, 12 and 13; symbols 0, 1, 2, 6, 7, 12 and 13; symbols 0, 1, 2, 6 and 7; symbols 2 to 13; symbols 2 to 11; symbols 2 to 10; symbols 2 to 9; symbols 2 to 7; symbols 2 to 6; symbols 2 to 5; symbols 3 to 13; symbols 3 to 11; symbols 3 to 10; symbols 3 to 9; symbols 3 to 8; symbols 3 to 7; symbols 3 to 6; symbols 3, 4, 5, 6, 7, 12 and 13; symbols 4 and 5; symbols 4 to 7; symbols 4 to 8; symbols 4 to 10; symbols 4 to 11; symbols 4 to 13; symbols 6 to 9; symbols 6 to 12; symbols 6 to 13; symbols 6 and 7; symbols 6, 7, 12 and 13; symbols 8 to 13; symbols 9 to 13; symbols 10 to 13; or symbols 12 and 13.

In a case where the combination of the first SCS and the second SCS is {15, 30} kHz, the time domain resource allocation pattern set includes one or more of the following time domain resource allocation patterns: symbols 2 to 13; symbols 2 to 11; symbols 2 to 10; symbols 2 to 9; symbols 2 to 7; symbols 2 to 6; symbols 2 to 5; symbols 2, 3, 12 and 13; symbols 2 and 3; symbols 3 to 13; symbols 3 to 11; symbols 3 to 10; symbols 3 to 9; symbols 3 to 8; symbols 3 to 7; symbols 3 to 6; symbols 3, 12 and 13; symbols 4 to 7; symbols 4 to 10; symbols 4 to 11; symbols 4 to 13; symbols 6 to 9; symbols 6 to 12; symbols 6 to 13; symbols 8 to 13; symbols 9 to 13; symbols 10 to 13; or symbols 12 and 13.

In a case where the combination of the first SCS and the second SCS is {30, 15} kHz, the time domain resource allocation pattern set includes one or more of the following time domain resource allocation patterns: symbols 0, 1, 2, 6 and 7; symbols 0, 1, 2, 6, 7, 10, 11, 12 and 13; symbols 0, 1, 2, 6, 7, 8, 9 and 10; symbols 0, 1, 2, 6, 7, 8, 9, 10 and 13; symbols 0, 1, 6 and 7; symbols 0, 1, 6, 7, 10, 11, 12 and 13; symbols 0, 1, 4, 5, 6, 7, 8 and 9; symbols 0, 1, 4, 5, 6, 7, 8, 9, 12 and 13; symbols 0, 1, 10, 11, 12 and 13; symbols 0, 1, 4, 5, 6, 7, 8, 9 and 10; symbols 0, 1, 4, 5, 6, 7, 8, 9, 10 and 13; symbols 0, 1, 4, 5, 6, 7, 10, 11, 12 and 13; symbols 0, 1, 4, 5, 6 and 7; symbols 0, 1, 6, 7, 8, 9, 10, 11, 12 and 13; symbols 0, 1, 6, 7, 8, 9, 10 and 11; symbols 2 to 13; symbols 2 to 11; symbols 2 to 10; symbols 2, 3, 4, 5, 6, 7, 8, 9, 10 and 13; symbols 2, 3, 4, 5, 6, 7, 8, 9, 12 and 13; symbols 2 to 9; symbols 2 to 7; symbols 2 to 6; symbols 2 to 5; symbols 2, 3, 6, 7, 10, 11, 12 and 13; symbols 2, 3, 6 and 7; symbols 2 and 3; symbols 3 to 13; symbols 3 to 11; symbols 3 to 10; symbols 3, 4, 5, 6, 7, 8, 9, 10 and 13; symbols 3 to 9;

symbols 3, 4, 5, 6, 7, 8, 9, 12 and 13; symbols 3 to 8; symbols 3 to 7; symbols 3 to 6; symbols 4 to 7; symbols 4 to 8; symbols 4 to 10; symbols 4, 5, 6, 7, 8, 9, 10 and 13; symbols 4 to 11; symbols 4 to 13; symbols 6 to 9; symbols 6 to 12; symbols 6 to 13; symbols 6, 7, 8, 9, 10 and 13; symbols 6, 7 and 8; symbols 6 and 7; symbols 6, 7 and 10; symbols 6, 7, 10 and 11; symbols 7 to 10; symbols 7, 8, 9, 10 and 13; symbols 7, 8, 9, 12 and 13; symbols 7, 10, 11, 12 and 13; symbols 8 to 13; symbols 8 and 9; symbols 9 to 13, symbols 9, 10 and 13; symbols 9, 12 and 13; symbols 10 to 13; symbols 11 to 13; or symbols 12 and 13.

In a case where the combination of the first SCS and the second SCS is {30, 30} kHz, the time domain resource allocation pattern set includes one or more of the following time domain resource allocation patterns: symbols 0, 1, 12 and 13; symbols 0, 1, 8, 9, 10 and 11; symbols 0, 1, 8, 9, 10, 11, 12 and 13; symbols 0, 1, 4, 5, 6, 7, 12 and 13; symbols 0, 1, 4, 5, 6 and 7; symbols 0, 1, 4 and 5; symbols 0, 1, 4, 5, 10, 11, 12 and 13; symbols 2, 3, 12 and 13; symbols 2, 3, 8 and 9; symbols 2, 3, 8, 9, 10, 11 and 12; symbols 2, 3, 8, 9, 10, 11, 12 and 13; symbols 2 to 13; symbols 2 to 11; symbols 2 to 10; symbols 2 to 9; symbols 2 to 7; symbols 2, 3, 4, 5, 6, 7, 12 and 13; symbols 2 to 6; symbols 2 to 5; symbols 2, 3, 4, 5, 10, 11, 12 and 13; symbols 3 to 13; symbols 3 to 11; symbols 3 to 10; symbols 3 to 9; symbols 3 to 8; symbols 3 to 7; symbols 3, 4, 5, 6, 7, 12 and 13; symbols 3 to 6; symbols 3, 12 and 13; symbols 4 to 6; symbols 4 to 7; symbols 4 to 8; symbols 4 to 10; symbols 4 to 11; symbols 4 to 13; symbols 4, 5, 6, 7, 12 and 13; symbols 4, 5 and 10; symbols 4, 5, 10, 11, 12 and 13; symbols 6 and 7; symbols 6 to 9; symbols 6 to 12; symbols 6 to 13; symbols 6, 7, 12 and 13; symbols 7, 12 and 13; symbols 8 to 13; symbols 8 to 11; symbols 9 to 13; symbols 10 to 13; symbols 10 and 11; symbols 11, 12 and 13; symbols 12 and 13; symbol 12; or symbol 13.

In a case where the combination of the first SCS and the second SCS is {120, 60} kHz, the time domain resource allocation pattern set includes one or more of the following time domain resource allocation patterns: symbols 0 to 6; symbols 0 to 3; symbols 0, 1, 2, 3 and 6; symbols 0, 1, 2, 3, 6, 8 and 9; symbols 0, 1, 2, 3, 6, 8, 9, 10 and 11; symbols 0, 1, 2, 3, 6, 8, 9, 10, 11, 12 and 13; symbols 0, 1, 2, 3, 6, 9, 10, 11, 12 and 13; symbols 0, 1, 2, 3, 6, 9 and 10; symbols 0, 1, 2, 3, 6, 10, 11, 12 and 13; symbols 0, 1, 2, 3, 6, 10 and 11; symbols 0, 1, 4 and 6; symbols 0, 1, 4, 5, 6, 8 and 9; symbols 0, 1, 4, 5, 6, 9 and 10; symbols 0, 1, 4, 5, 6, 9, 10, 11, 12 and 13; symbols 0, 1, 4, 5, 6, 8, 9, 10 and 11; symbols 0, 1, 4, 5, 6, 8, 9, 10, 11, 12 and 13; symbols 1, 4, 5 and 6; symbols 1, 2, 3 and 6; symbols 1, 2, 3, 6 and 8; symbols 2, 3, 6 and 9; symbols 2 to 13; symbols 2 to 11; symbols 2 to 10; symbols 2 to 9; symbols 2 to 7; symbols 2 to 6; symbols 2 to 5; symbols 3 to 13; symbols 3 to 11; symbols 3 to 10; symbols 3 to 9; symbols 3 to 8; symbols 3 to 7; symbols 3 to 6; symbols 3, 6 and 10; symbols 4, 5, 6 and 9; symbols 4 to 7; symbols 4 to 8; symbols 4 to 10; symbols 4 to 11; symbols 4 to 13; symbols 5, 6, 12 and 13; symbols 6 to 9; symbols 6 to 12; symbols 6 to 13; symbols 6, 12 and 13; symbols 6, 9, 12 and 13; symbols 8, 9, 12 and 13; symbols 8 to 13; symbols 9 to 13; symbols 9 to 12; symbols 9, 12 and 13; symbols 10 to 13; or symbols 12 and 13.

In a case where the combination of the first SCS and the second SCS is {120, 120} kHz, the time domain resource allocation pattern set includes one or more of the following time domain resource allocation patterns: symbols 1 and 6; symbols 1, 6, 8 and 9; symbols 1 to 4; symbols 1 to 6; symbols 2 to 13; symbols 2 to 11; symbols 2 to 10; symbols 2 to 9; symbols 2 to 7; symbols 2 to 6; symbols 2 to 5; symbols 3 to 13; symbols 3 to 11; symbols 3 to 10; symbols 3 to 9; symbols 3 to 8; symbols 3 to 7; symbols 3 to 6; symbols 4 to 7; symbols 4 to 8; symbols 4 to 10; symbols 4 to 11; symbols 4 to 13; symbols 6 to 9; symbols 6 to 12; symbols 6 to 13; symbols 8 to 13; symbols 8 to 11; symbols 9 to 13; symbols 10 to 13; or symbols 12 and 13.

In a case where the combination of the first SCS and the second SCS is {240, 60} kHz, the time domain resource allocation pattern set includes one or more of the following time domain resource allocation patterns: symbols 1, 6, 8 and 9; symbols 1 to 4; symbols 2 to 13; symbols 2 to 11; symbols 2 to 10; symbols 2 to 9; symbols 2 to 7; symbols 2 to 6; symbols 2 to 5; symbols 3 to 13; symbols 3 to 11; symbols 3 to 10; symbols 3 to 9; symbols 3 to 8; symbols 3 to 7; symbols 3 to 6; symbols 4 to 7; symbols 4 to 8; symbols 4 to 10; symbols 4 to 11; symbols 4 to 13; symbols 5, 6, 12 and 13; symbols 6 to 9; symbols 6 to 12; symbols 6 to 13; symbols 6, 7, 12 and 13; symbols 8 to 13; symbols 8 to 11; symbols 9 to 13; symbols 9 to 12; symbols 10 to 13; or symbols 12 and 13.

In a case where the combination of the first SCS and the second SCS is {240, 120} kHz, the time domain resource allocation pattern set includes one or more of the following time domain resource allocation patterns: symbols 1, 4, 5 and 6; symbols 1, 2, 3 and 6; symbols 1 to 6; symbols 2, 3, 6 and 9; symbols 2 to 13; symbols 2 to 11; symbols 2 to 10; symbols 2 to 9; symbols 2 to 7; symbols 2 to 6; symbols 2 to 5; symbols 3 to 13; symbols 3 to 11; symbols 3 to 10; symbols 3 to 9; symbols 3 to 8; symbols 3 to 7; symbols 3 to 6; symbols 4, 5, 8 and 9; symbols 4, 5, 6 and 9; symbols 4 to 7; symbols 4 to 8; symbols 4 to 10; symbols 4 to 11; symbols 4 to 13; symbols 5 to 13; symbols 6 to 9; symbols 6 to 12; symbols 6 to 13; symbols 6 and 7; symbols 6, 7, 12 and 13; symbols 6, 9, 12 and 13; symbols 8 to 13; symbols 8, 9, 12 and 13; symbols 8 to 11; symbols 9 to 13; symbols 9 to 12; symbols 10 to 13; or symbols 12 and 13.

In the embodiment, the first subcarrier spacing (SCS) refers to an SCS corresponding to the first channel signal, where the first channel signal refers to the synchronization signal physical broadcast channel block (SSB); and the second SCS refers to an SCS corresponding to the second channel signal, where the second channel signal includes at least one of the physical downlink shared channel (PDSCH) carrying the remaining minimum system information (RMSI), the PDSCH carrying the paging information, the PDSCH carrying other system information (OSI), the PDSCH carrying the random access response information, the PDSCH carrying the random access collision resolution information, the PDSCH carrying message 2 (MSG2), or the PDSCH carrying message 4 (MSG4).

In another aspect, the present disclosure further provides a time domain resource detection method. The method includes that a terminal detects downlink control information of a second channel signal in one or more slots within a monitoring window corresponding to the second channel signal.

Optionally, the second channel signal includes at least one of a physical downlink shared channel (PDSCH) carrying remaining minimum system information (RMSI), a PDSCH carrying paging information, a PDSCH carrying other system information (OSI), a PDSCH carrying random access response information, a PDSCH carrying random access collision resolution information, a PDSCH carrying message 2 (MSG2), or a PDSCH carrying message 4 (MSG4).

Optionally, in a case where the terminal correctly detects the downlink control information of the second channel signal, but does not correctly detect the second channel signal, the terminal detects the downlink control information of the channel signal in other slots of the plurality of slots within the monitoring window.

Optionally, in a case where the terminal correctly detects not only downlink control information of RMSI, but also the RMSI, but does not correctly detect random access response information, the terminal detects the downlink control information of the RMSI in other slots of the plurality of slots within the monitoring window.

From the description of the embodiments described above, it is apparent to those skilled in the art that the methods in the embodiments described above may be implemented by software plus a necessary general-purpose hardware platform, or may of course be implemented by hardware. However, in many cases, the former is a preferred implementation. Based on such understanding, the solution provided by the present disclosure substantially, or the part contributing to the related art may be embodied in the form of a software product. The computer software product is stored in a storage medium (such as ROM/RAM, a magnetic disk or an optical disk). The storage medium includes several instructions for enabling a terminal device (which may be a mobile phone, a computer, a server or a network device) to perform the methods described in various embodiments of the present disclosure.

Embodiment Two

Time domain resource determination and detection apparatuses are further provided in the embodiment. The apparatuses are configured to implement the embodiments and the preferable implementations described above. What has been described is not repeated. As used below, the term "module" may be software, hardware or a combination thereof capable of implementing predetermined functions. The apparatuses described below in the embodiments may be implemented by software, but implementation by hardware or by a combination of software and hardware is also possible and conceived.

Figure 4:
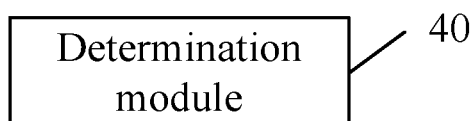
FIG. 4 is a block diagram of a time domain resource determination apparatus according to an embodiment of the present disclosure.

This embodiment provides a domain resource determination apparatus. FIG. 4 is a block diagram of a time domain resource determination apparatus according to an embodiment of the present disclosure. The apparatus includes a determination module 40. The determination module 40 is configured to determine a time domain resource allocation pattern set. The time domain resource allocation pattern set includes at least one of a time domain resource allocation pattern set corresponding to a combination of a first subcarrier spacing (SCS) and a second SCS, where the first SCS is an SCS of a first channel signal, and the second SCS is an SCS of a second channel signal; a time domain resource allocation pattern set indicated by downlink control information (DCI) signaling; or a time domain resource allocation pattern set corresponding to a slot type. A time domain resource allocation pattern in the time domain resource allocation pattern set is used to indicate symbols occupied by the second channel signal.

This embodiment provides another time domain resource determination apparatus. The apparatus includes a first determination module and a second determination. The first determination module is configured to determine a time domain resource allocation pattern set according to at least one of the following modes: determining the time domain resource allocation pattern set according to a combination of a first subcarrier spacing (SCS) and a second SCS, determining the time domain resource allocation pattern set according to an indication of downlink control information (DCI) signaling, or determining the time domain resource allocation pattern set according to a slot type. The second determination module is configured to determine, according to a time domain resource allocation pattern in the time domain resource allocation pattern set, symbols occupied by the second channel signal.

This embodiment further provides a time domain resource detection apparatus. The apparatus includes a detection module. The detection module is configured to detect downlink control information of a second channel signal in one or more slots within a monitoring window corresponding to the second channel signal.

In an embodiment, the various modules described above may be implemented by software or hardware. Implementation by hardware may, but may not necessarily, be performed in the following manner: the multiple modules described above are located in the same processor, or the various modules described above are located in their respective processors in any combination.

Embodiment Three

In a scheme of the embodiment, a first channel signal is a synchronization signal physical broadcast channel block (SS/PBCH block, SSB). Mapping patterns for SSBs in slots may be different with different subcarrier spacings. The mapping patterns include the cases described below.

Figure 5:
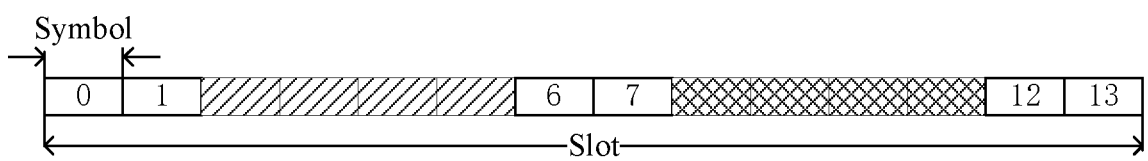
FIG. 5 is mapping pattern 1 for SSBs in slots according to an embodiment of the present disclosure.

Case A: As shown in FIG. 5, FIG. 5 is mapping pattern 1 for SSBs in a slot according to an embodiment of the present disclosure. The SSB mapping pattern shown in FIG. 5 corresponds to an SSB mapping pattern with a subcarrier spacing of 15 kHz. FIG. 5 illustrates transmission resources for various SSBs. A 15 kHz slot (that is, 14 symbols of 15 kHz, which are symbol 0 to symbol 13) contains two SSBs. Each of the two SSBs occupies 4 symbols of 15 kHz. The two SSBs are mapped onto symbol 2 to symbol 5 and symbol 8 to symbol 11 respectively.

Figure 6:
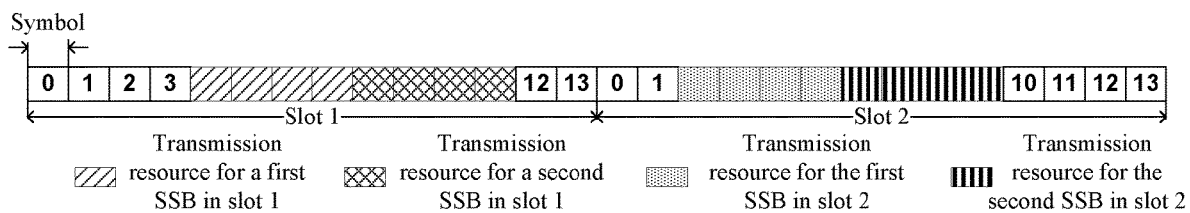
FIG. 6 is mapping pattern 2 for SSBs in slots according to an embodiment of the present disclosure.

Case B: As shown in FIG. 6, FIG. 6 is mapping pattern 2 for SSBs in slots according to an embodiment of the present disclosure. The SSB mapping pattern shown in FIG. 6 corresponds to an SSB mapping pattern with a subcarrier spacing of 30 kHz. FIG. 6 illustrates transmission resources for various SSBs. Two 30 kHz slots (that is, 28 symbols of 30 kHz, which are two groups of symbol 0 to symbol 13) contain four SSBs. Each of the four SSBs occupies 4 symbols of 30 kHz. The four SSBs are mapped onto symbol 4 to symbol 7 in a first slot, symbol 8 to symbol 11 in the first slot, symbol 2 to symbol 5 in a second slot, and symbol 6 to symbol 9 in the second slot respectively.

Figure 7:
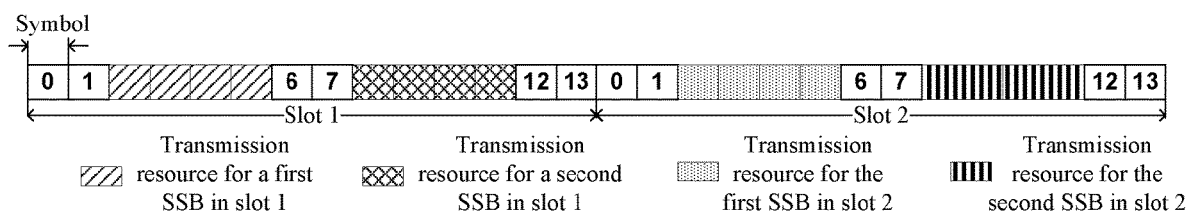
FIG. 7 is mapping pattern 3 for SSBs in slots according to an embodiment of the present disclosure.

Case C: As shown in FIG. 7, FIG. 7 is mapping pattern 3 for SSBs in slots according to an embodiment. The SSB mapping pattern shown in FIG. 7 corresponds to an SSB mapping pattern with a subcarrier spacing of 30 kHz. FIG. 7 illustrates transmission resources for various SSBs. Two 30 kHz slots (that is, 28 symbols of 30 kHz, which are two groups of symbol 0 to symbol 13) contain four SSBs. Each of the four SSBs occupies 4 symbols of 30 kHz. The four SSBs are mapped onto symbol 2 to symbol 5 in a first slot, symbol 8 to symbol 11 in the first slot, symbol 2 to symbol 5 in a second slot, and symbol 8 to symbol 11 in the second slot respectively.

Figure 8:
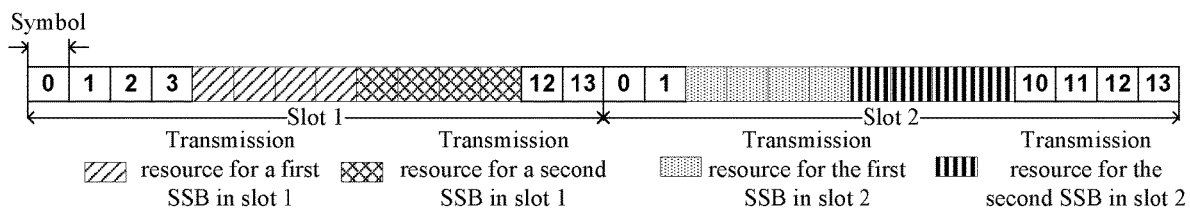
FIG. 8 is mapping pattern 4 for SSBs in slots according to an embodiment of the present disclosure.

Case D: As shown in FIG. 8, FIG. 8 is mapping pattern 4 for SSBs in slots according to an embodiment of the present disclosure. The SSB mapping pattern shown in FIG. 8 corresponds to an SSB mapping pattern with a subcarrier spacing of 120 kHz. FIG. 8 illustrates transmission resources for various SSBs. Two 120 kHz slots (that is, 28 symbols of 120 kHz, which are two groups of symbol 0 to symbol 13) contain four SSBs. Each of the four SSBs occupies 4 symbols of 120 kHz. The four SSBs are mapped onto symbol 4 to symbol 7 in a first slot, symbol 8 to symbol 11 in the first slot, symbol 2 to symbol 5 in a second slot, and symbol 6 to symbol 9 in the second slot respectively.

Figure 9:
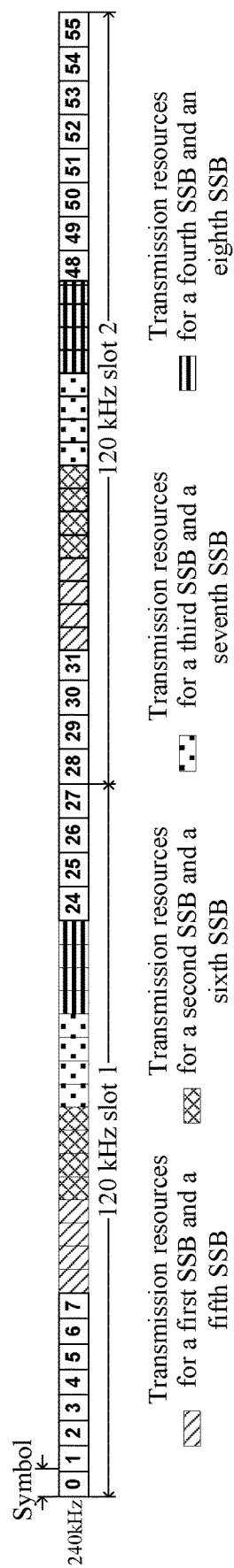
FIG. 9 is mapping pattern 5 for SSBs in slots according to an embodiment of the present disclosure.

Case E: As shown in FIG. 9, FIG. 9 is mapping pattern 5 for SSBs in slots according to an embodiment of the present disclosure. The SSB mapping pattern shown in FIG. 9 corresponds to an SSB mapping pattern with a subcarrier spacing of 240 kHz. FIG. 9 illustrates transmission resources for various SSBs. Two 120 kHz slots (that is, 56 symbols of 240 kHz, which are symbol 0 to symbol 55) contain eight SSBs. Each of the eight SSBs occupies 4 symbols of 240 kHz which are numbered into symbols within the preceding time period (56 symbols). The eight SSBs are mapped onto symbol 8 to symbol 11, symbol 12 to symbol 15, symbol 16 to symbol 19, symbol 20 to symbol 23, symbol 32 to symbol 35, symbol 36 to symbol 39, symbol 40 to symbol 43, and symbol 44 to symbol 47.

The preceding description illustrates the cases of symbol occupation when an SSB is mapped onto a slot with the same subcarrier spacing as the SSB. In a case where the SSB is mapped onto a slot with a subcarrier spacing different from that of the SSB, an absolute time location occupied by the SSB remains unchanged, and an index of a occupied symbol may be translated into an index of a symbol for a target subcarrier spacing.

For example, as shown in Table 1, in a case where a 15 kHz SSB is mapped onto a 30 kHz slot, there are two 30 kHz slots containing two SSBs, and the two SSBs occupy symbol 4 to symbol 11 in a first 30 kHz slot, and symbol 2 to symbol 9 in a second 30 kHz slot.

TABLE 1

| 30 kHz Slot | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 15 kHz SSB in a first 30 kHz Slot | | | | | | | | | SSB | | | | | |
| 15 kHz SSB in a second 30 kHz Slot | | | | | SSB | | | | | | | | | |

For RMSI reception, it may be regarded that an SSB with a certain subcarrier spacing is mapped onto a slot corresponding to a subcarrier spacing of RMSI. Time domain allocation locations are described for different combinations of the SSB and the RMSI subcarrier spacing in subsequent embodiments.

Pattern 1 is for time division multiplexing between the SSB and the RMSI. As shown in Table 2, for pattern 1, the number and locations of RMSI search space symbols are described below. The RMSI search space is used to carry an RMSI PDCCH. Bolded Dc denotes a second search space location in a slot. Note: It is also feasible to send only a PDCCH in a second search space in the slot (that is, corresponding to configurations 13 to 19).

TABLE 2

| Search Space Location | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 1 | Dc | | | | | | | | | | | | | |
| 2 | | Dc | | | | | | | | | | | | |
| 3 | | | Dc | | | | | | | | | | | |
| 4 | Dc | Dc | | | | | | | | | | | | |
| 5 | | Dc | Dc | | | | | | | | | | | |
| 6 | Dc | Dc | Dc | | | | | | | | | | | |
| 7 | Dc | Dc | | | | | | | | | | | | |
| 8 | Dc | Dc | Dc | Dc | | | | | | | | | | |
| 9 | Dc | | | | | | | | Dc | | | | | |
| 10 | Dc | Dc | | | | | | | Dc | Dc | | | | |
| 11 | Dc | Dc | Dc | Dc | Dc | Dc | | | | | | | | |
| 12 | Dc | Dc | Dc | | | | | | Dc | Dc | Dc | | | |
| 13 | | Dc | | | | | | | | | | | | |
| 14 | | | Dc | Dc | | | | | | | | | | |
| 15 | | | | | | | | | Dc | | | | | |
| 17 | | | | | | | | | Dc | Dc | | | | |
| 18 | | | Dc | Dc | Dc | | | | | | | | | |
| 19 | | | | | | | | | Dc | Dc | Dc | | | |

The embodiment provides a time domain resource allocation method and system. The method includes allocating disconsecutive PDSCH time domain resources, defining an RMSI time domain resource allocation list for different subcarrier spacing combinations, defining time domain resource allocation in view of a mapping location of an SSB in a slot, and supporting a PDCCH to schedule a PDSCH located in preceding symbols in the same slot.

This embodiment further includes the implementation solutions described below for explaining the scheme of the embodiment in different SCS combinations.

Implementation one: SCS {SSB, RMSI}={15, 15} kHz

In a case where the subcarrier spacing (SCS) combination {SSB, RMSI}={15, 15} kHz, Table 3 shows mapping locations of SSBs in a slot, and possible locations of an RMSI search space. Based on this, Table 3 further shows time domain allocation patterns for an RMSI PDSCH in a case where there are some or all SSBs.

TABLE 3

| Search Space Location | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| SSB Mapping Location | | | | | SSB1 | | | | | | SSB2 | | | |
| 1 | Dc | | | | | | | | | | | | | |
| 2 | | Dc | | | | | | | | | | | | |
| 3 | | | Dc | | | | | | | | | | | |
| 4 | Dc | Dc | | | | | | | | | | | | |
| 5 | | Dc | Dc | | | | | | | | | | | |
| 6 | Dc | Dc | Dc | | | | | | | | | | | |
| 7 | Dc | Dc | | | | | | | | | | | | |
| 8 | Dc | Dc | Dc | Dc | | | | | | | | | | |
| 9 | Dc | Dc | Dc | Dc | Dc | Dc | | | | | | | | |
| 10 | | Dc | | | | | | | | | | | | |
| 11 | | | Dc | Dc | | | | | | | | | | |
| 12 | | | | Dc | Dc | Dc | | | | | | | | |

As shown in Table 4, Dc denotes a symbol where the RMSI search space is locate in the slot. In view of search space locations 1, 2, 4 or 10, search space locations 1, 2, 4 and 10 are considered as a classification since the symbol locations of search space locations 1, 2, 4 or 10 do not exceed the second symbol. In view of search space locations 3, 5 or 6, search space locations 3, 5 and 6 are considered as a classification since the last symbol of search space locations 3, 5 and 6 is the third symbol. In a case where a slot includes two search spaces, a second search space is denoted in bold. SSB in the table denotes a symbol onto which an SSB is mapped. Dd denotes a symbol occupied by a PDSCH. In a case where a slot contains two search spaces, a symbol in the second search space, occupied by the PDSCH and allocated by a PDCCH is denoted in bold.

TABLE 4

| Search Space Location | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 1, 2, 4, 10 | Dc | | | SSB | | | | Dd | | | | | | |
| 1, 2, 4, 10 | Dc | | | SSB | | | | | Dd | | | | | |
| 1, 2, 4, 10 | Dc | | | SSB | | | | | | | Dd | | | |
| 1, 2, 4, 10 | Dc | | | Dd | | | | | | | SSB | | | |
| 1, 2, 4, 10 | Dc | | | SSB | | Dd | | | | | SSB | | Dd | |
| 3, 5, 6 | | | Dc | | Dd | | | | | | SSB | | | |
| 3, 5, 6 | | | Dc | | Dd | | | | | | SSB | | Dd | |
| 7 | Dc | Dc | | SSB | | | | Dd | | | | | Dd | |
| 7 | Dc | Dc | | Dd | | | | Dd | | | SSB | | Dd | |
| 8 | Dc | | Dc | Dd | | Dd | | | | | SSB | | | |
| 8 | Dc | | Dc | | Dd | | | | | | SSB | | Dd | |
| 9 | | Dc | | Dc | | Dd | | | | | SSB | | Dd | |
| 11 | | | Dc | | Dd | | | | | | SSB | | | |
| 11 | Dd | | Dc | | Dd | | | | | | SSB | | | |
| 11 | Dd | | Dc | | Dd | | | | | | SSB | | Dd | |
| 12 | | | | Dc | | Dd | | | | | SSB | | Dd | |
| 12 | Dd | | | Dc | | Dd | | | | | SSB | | | |
| 12 | Dd | | | Dc | | Dd | | | | | SSB | | Dd | |

Table 5 shows possible time domain resource allocation patterns in a case where the slot RMSI located contains no SSB.

TABLE 5

| Search Space Location | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 1, 2, 4, 10 |  | Dc |  | Dd | Dd | Dd | Dd | Dd | Dd | Dd | Dd | Dd | Dd | Dd |
| 1, 2, 4, 10 |  | Dc |  | Dd | Dd | Dd | Dd | Dd | Dd | Dd | Dd | Dd |  |  |
| 1, 2, 4, 10 |  | Dc |  | Dd | Dd | Dd | Dd | Dd | Dd | Dd | Dd |  |  |  |
| 1, 2, 4, 10 |  | Dc |  | Dd | Dd | Dd | Dd | Dd | Dd | Dd |  |  |  |  |
| 1, 2, 4, 10 |  | Dc |  | Dd | Dd | Dd | Dd | Dd | Dd |  |  |  |  |  |
| 1, 2, 4, 10 |  | Dc |  | Dd | Dd | Dd | Dd | Dd |  |  |  |  |  |  |
| 1, 2, 4, 10 |  | Dc |  | Dd | Dd | Dd | Dd |  |  |  |  |  |  |  |
| 1, 2, 4, 10 |  | Dc |  | Dd | Dd | Dd |  |  |  |  |  |  |  |  |
| 3, 5, 6 |  |  | Dc | Dd | Dd | Dd | Dd | Dd | Dd | Dd | Dd | Dd | Dd | Dd |
| 3, 5, 6 |  |  | Dc | Dd | Dd | Dd | Dd | Dd | Dd | Dd | Dd | Dd |  |  |
| 3, 5, 6 |  |  | Dc | Dd | Dd | Dd | Dd | Dd | Dd | Dd | Dd |  |  |  |
| 3, 5, 6 |  |  | Dc | Dd | Dd | Dd | Dd | Dd | Dd | Dd |  |  |  |  |
| 3, 5, 6 |  |  | Dc | Dd | Dd | Dd | Dd | Dd | Dd |  |  |  |  |  |
| 3, 5, 6 |  |  | Dc | Dd | Dd | Dd | Dd | Dd |  |  |  |  |  |  |
| 3, 5, 6 |  |  | Dc | Dd | Dd | Dd | Dd |  |  |  |  |  |  |  |
| 7 |  | Dc | Dc |  | Dd |  |  |  | Dd |  |  |  |  |  |
| 7 |  | Dc | Dc |  |  | Dd |  |  |  |  | Dd |  |  |  |
| 8 |  | Dc | Dc |  |  |  | Dd |  |  |  |  | Dd |  |  |
| 9 |  | Dc | Dc |  |  |  |  | Dd |  |  |  |  | Dd |  |
| 10 |  | Dc |  |  | Dc |  |  |  | Dd |  |  |  |  | Dd |
| 11 |  | Dc |  | Dd |  |  |  |  |  |  |  |  |  |  |
| 11 |  | Dc |  |  |  | Dd |  |  |  |  |  |  |  |  |
| 11 |  | Dc |  |  |  |  | Dd |  |  |  |  |  |  |  |
| 11 |  | Dc |  |  |  |  |  | Dd |  |  |  |  |  |  |
| 12 |  |  |  |  | Dc |  | Dd |  |  |  |  |  |  |  |
| 12 |  |  |  |  | Dc |  |  |  | Dd |  |  |  |  |  |
| 12 |  |  |  |  | Dc |  |  |  |  | Dd |  |  |  |  |

When labels of Dc symbols and SSB symbols in Tables 4 and 5 are hided and only labels of PDSCH symbols (that is, Dd) in Tables 4 and 5 are retained, each row in Tables 4 and 5 corresponds to a time domain resource allocation pattern. That is, a set of symbols labeled Dd in each row is defined as a time domain resource allocation pattern. Identical resource allocation patterns are merged and time domain resource allocation pattern sets as showed in Table 6 is obtained. That is, Table 6 shows sets of possible time domain resource allocation patterns in a case where SCS combination {SSB, RMSI}={15, 15} kHz. There are 34 sets in total. Several sets may be selected from among the 34 sets, and the time domain allocation may be indicated by the corresponding number of bits in an RMSI PDCCH. For example, 32 sets are selected from the 34 time domain resource allocation pattern sets to serve as default time domain resource allocation pattern sets for the RMSI, and correspondingly, a currently used time domain resource allocation pattern for the PDSCH is indicated to a terminal by 5 bits. For another example, in the standard, 15 sets selected from the 34 time domain resource allocation pattern sets are defined as the default time domain resource allocation pattern sets for the RMSI, and correspondingly, the currently used time domain resource allocation pattern for the PDSCH is indicated to the terminal by 4 bits, in which there is one reserved state.

TABLE 6

| RA(i) | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 |  | Dd | Dd |  | Dd | Dd | Dd | Dd |  |  |  |  |  |  |
| 1 |  | Dd | Dd |  | Dd | Dd | Dd | Dd |  |  |  |  | Dd | Dd |
| 2 |  | Dd | Dd | Dd |  | Dd | Dd |  |  |  |  |  | Dd | Dd |
| 3 |  | Dd | Dd | Dd |  | Dd | Dd |  |  |  |  |  |  |  |
| 4 |  |  | Dd | Dd | Dd | Dd | Dd | Dd | Dd | Dd | Dd | Dd | Dd | Dd |
| 5 |  |  | Dd | Dd | Dd | Dd | Dd | Dd | Dd | Dd | Dd |  |  |  |
| 6 |  |  | Dd | Dd | Dd | Dd | Dd | Dd | Dd | Dd |  |  |  |  |
| 7 |  |  | Dd | Dd | Dd | Dd | Dd | Dd | Dd |  |  |  |  |  |
| 8 |  |  | Dd | Dd | Dd | Dd | Dd | Dd |  |  |  |  |  |  |
| 9 |  |  | Dd | Dd | Dd | Dd | Dd |  |  |  |  |  |  |  |
| 10 |  |  | Dd | Dd | Dd | Dd |  |  |  |  |  |  |  |  |
| 11 |  |  |  |  | Dd | Dd | Dd | Dd | Dd | Dd | Dd | Dd | Dd | Dd |
| 12 |  |  |  |  | Dd | Dd | Dd | Dd | Dd | Dd | Dd | Dd | Dd |  |
| 13 |  |  |  |  | Dd | Dd | Dd | Dd | Dd | Dd | Dd | Dd |  |  |
| 14 |  |  |  |  | Dd | Dd | Dd | Dd | Dd | Dd | Dd |  |  |  |
| 15 |  |  |  |  | Dd | Dd | Dd | Dd | Dd | Dd |  |  |  |  |
| 16 |  |  |  |  | Dd | Dd | Dd | Dd | Dd |  |  |  |  |  |
| 17 |  |  |  |  | Dd | Dd | Dd | Dd |  |  |  |  |  |  |
| 18 |  |  |  |  | Dd | Dd | Dd | Dd |  |  |  |  | Dd | Dd |
| 19 |  |  |  |  | Dd | Dd |  |  |  |  |  |  |  |  |
| 20 |  |  |  |  | Dd | Dd | Dd | Dd |  |  |  |  |  |  |
| 21 |  |  |  |  | Dd | Dd | Dd | Dd | Dd |  |  |  |  |  |
| 22 |  |  |  |  | Dd | Dd | Dd | Dd | Dd | Dd |  |  |  |  |
| 23 |  |  |  |  | Dd | Dd | Dd | Dd | Dd | Dd | Dd |  |  |  |
| 24 |  |  |  |  | Dd | Dd | Dd | Dd | Dd | Dd | Dd | Dd | Dd |  |
| 25 |  |  |  |  |  | Dd | Dd | Dd | Dd |  |  |  |  |  |
| 26 |  |  |  |  |  | Dd | Dd | Dd | Dd | Dd | Dd |  |  |  |
| 27 |  |  |  |  |  | Dd | Dd | Dd | Dd | Dd | Dd | Dd |  |  |
| 28 |  |  |  |  |  | Dd | Dd |  |  |  |  |  |  |  |
| 29 |  |  |  |  |  | Dd | Dd |  |  |  |  |  | Dd | Dd |
| 30 |  |  |  |  |  |  |  |  |  | Dd | Dd | Dd | Dd | Dd |
| 31 |  |  |  |  |  |  |  |  |  |  | Dd | Dd | Dd | Dd |
| 32 |  |  |  |  |  |  |  |  |  |  |  | Dd | Dd | Dd |
| 33 |  |  |  |  |  |  |  |  |  |  |  |  | Dd | Dd |

In the indication for time domain resource allocation patterns according to the embodiment, in view of a combination of a specific first SCS (corresponding to the SSB) and a second SCS (corresponding to at least one of RMSI, OSI, paging, msg2 or msg4), time domain resource allocation patterns where the slot contains the SSB (Table 4) and time domain resource allocation patterns where the slot contains no SSB (Table 5) are combined into a time domain resource allocation pattern set. The currently used time domain resource allocation pattern in the set is indicated to the terminal by downlink control information (DCI) signaling. Different combinations of first SCS and the second SCS may correspond to a same or a different time domain resource allocation pattern set for the second signal channel.

In some other implementations, multiple time domain resource allocation pattern sets may be defined for the combination of the first SCS and the second SCS (including that a combination of one first SCS and one second SCS corresponds to multiple time domain resource allocation pattern sets, or multiple combinations of first SCS and second SCS corresponds to multiple time domain resource allocation pattern sets). Firstly, a used time domain resource allocation pattern set is indicated to the terminal by a DCI signaling. Then, a currently used time domain resource allocation pattern in the designated set is further indicated to the terminal by the DCI signaling. For example, there are two time domain resource allocation pattern sets are defined, one corresponds to the time domain resource allocation patterns in a case where the slot contains the SSB (Table 4) and the other corresponds to the time domain resource allocation patterns in a case where the slot contains no SSB (Table 5). The currently used time domain resource allocation pattern set is indicated to the terminal by 1 bit in the downlink control information (DCI), and the currently used time domain resource allocation pattern in the indicated time domain resource allocation pattern set is also indicated. In this case, the terminal determine at least one time domain resource allocation pattern set according to a acquired first SCS (which may corresponds to a frequency band, where the terminal may determine the first SCS according to the current frequency band to which the first signal channel belongs, alternatively, the terminal determines the first SCS by blindly detecting the first channel signal, that is, the terminal uses different SCSs to detect the first signal channel and determines the value of the first SCS according to whether the detection is successful) and acquired second SCS (which may be an SCS notificated by a base station. For example, the second SCS is notificated in a physical broadcast channel. Alternatively, the second SCS may be predefined or corresponds to the frequency band), determines time domain resource allocation pattern sets and a specifical time domain resource allocation pattern set according to a DCI indication.

For the time domain allocation patterns where the slot contains no SSB, it is also feasible to be indicated by an existing indication method for time domain resource allocation. That is, the currently used time domain resource allocation is indicated by a parameter "start and length indicator (SLIV)". Each SLIV index corresponds to a symbol allocation scheme, which can uniquely indicate a starting symbol of allocated symbols and the number of allocated symbols. For the time domain resource allocation patterns where the slot contains the SSB, the currently used time domain resource allocation may be indicated by listing time domain resource allocation patterns in a table in conjunction with the DCI signaling.

In some other implementations, the currently used time domain resource allocation pattern set may be indicated by defining a correspondence between a slot type and a time domain resource allocation pattern set rather than by information bits in the downlink control information. For example, a slot is divided into the following two classifications: a slot containing a transmission resource for the first channel signal (SSB), and a slot containing no transmission resource for the first channel signal (SSB). In this case, for the slot containing the transmission resource for the first channel signal (SSB), the terminal determine "the time domain resource allocation patterns in a case where the slot contains the SSB (Table 4)" to serve as the currently used the time domain resource allocation pattern set; for the slot containing no transmission resource for the first channel signal (SSB), the terminal determines "the time domain resource allocation patterns in a case where the slot contains no SSB (Table 5)" to serve as the time domain resource allocation pattern set. Further, the base station indicates the currently used time domain resource allocation pattern to the terminal by the downlink control information.

Specifically, in a certain combination of the first SCS and the second SCS, multiple time domain resource allocation pattern sets are defined. Further, the terminal determines a currently used time domain resource allocation pattern set for the slot according to a current slot type.

Since the terminal does not know whether an SSB is actually transmitted in a certain slot containing an SSB transmission resource, "whether a transmission resource for the first channel signal (SSB) is contained" is used herein as the basis for distinguishing slot types, rather than using "whether the first channel signal (SSB) is contained" as the basis for distinguishing slot types.

In some other embodiments, the currently used time domain resource allocation pattern set may be only notificated by a DCI signaling. That is, the domain resource allocation pattern set is not related to combinations of SCS, multiple defined time domain resource allocation pattern sets are applicable to all combinations of the first SCS and the second SCS, and the currently used time domain resource allocation pattern set is notificated only by signaling.

In some other embodiments, the currently used time domain resource allocation pattern set may be determined according to only the slot type. That is, the domain resource allocation pattern set is not related to combinations of SCS and is not notificated by signaling.

In some other embodiments, the time domain resource allocation pattern set may be determined by the slot type and the DCI signaling. That is, multiple time domain resource allocation pattern sets are determined by the slot type, and a currently used time domain resource allocation pattern set is informed by the DCI signaling. Alternatively, a group of time domain resource allocation pattern sets is indicated by the DCI signaling, and a currently used time domain resource allocation pattern set is determined according to the slot type by a UE.

In some other implementations, the time domain resource allocation pattern set may be determined by combinations of SCS, the slot type and the DCI signaling.

Note: a predefinition of a correspondence between indication manners and the time domain resource allocation pattern sets is needed, no matter the time domain resource allocation pattern set is determined by which indication manner. In an embodiment, the predefinition may be specified in a protocol.

Note: The DCI signaling mentioned above may be signaling carried on other carriers, for example, radio resource control (RRC) signaling carried on other carriers.

The preceding description is available to other implementations.

Implementation two: SCS{SSB, RMSI}={15, 30} kHz

In a case where the subcarrier spacing (SCS) combination {SSB, RMSI}={15, 30} kHz, Table 7 shows mapping locations of SSBs in a slot, and possible locations of an RMSI search space (that is, Dc denotes a symbol where the RMSI search space is located in the slot). Based on this, time domain allocation patterns for an RMSI PDSCH in a case where there are some or all SSBs are further given. In the embodiment, in view of space location 1, 2, 4 or 10, symbol locations do not exceed the second symbol, the search space locations 1, 2, 4 and 10 are considered as a classification. In view of the last symbol of search space location 3, 5 or 6 is the third symbol, the search space locations 3, 5 and 6 are considered as a classification. In a case where the slot includes two search spaces, a second search space is denoted in bold. SSB denotes symbols onto which an SSB is mapped. Dd denotes a symbol occupied by the PDSCH. In a case where a slot contains two search spaces, a symbol in the second search space, occupied by the PDSCH and allocated by a PDCCH is denoted in bold.

TABLE 7

| Search Space Location | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| SSB in a First RMSI Slot | | | | | | | | | SSB | | | | | |
| 1, 2, 4, 10 | | | Dc | Dd | Dd | | | | SSB | | | | Dd | Dd |
| 1, 2, 4, 10 | | | Dc | Dd | Dd | | | | SSB | | | | | |
| 3, 5, 6 | | | | Dc | Dd | | | | SSB | | | | | |
| 3, 5, 6 | | | | Dc | Dd | | | | SSB | | | | Dd | Dd |
| 7 | | Dc | Dc | Dd | Dd | | | | SSB | | | | Dd | Dd |
| 8 | | Dc | Dc | Dc | Dc | | | | SSB | | | | Dd | Dd |
| 11 | | | | | Dc | Dc | | | SSB | | | | Dd | Dd |
| SSB in a Second RMSI Slot | | | | | | | SSB | | | | | | | |
| 1, 2, 4, 10 | | | Dc | | | | SSB | | | | Dd | Dd | Dd | Dd |

Possible time domain resource allocation patterns in a case where the slot RMSI located contains no SSB still refer to Table 5.

When labels of Dc symbols and SSB symbols in Tables 7 and 5 are hided and only labels of PDSCH symbols (that is, Dd) in Tables 7 and 5 are retained, each row in Tables 7 and 5 corresponds to a time domain resource allocation pattern. That is, a set of symbols labeled Dd in each row is defined as a time domain resource allocation pattern. Identical resource allocation patterns are merged and a time domain resource allocation table as shown in Table 8 is obtained. Table 8 shows possible time domain resource allocation manners in a case where SCS combination {SSB, RMSI}={15, 30} kHz. There are 28 manners in total. Several manners may be selected from among the 28 manners, and the time domain allocation may be indicated in an RMSI PDCCH by the corresponding number of bits. For example, a currently used time domain resource allocation for the PDSCH is indicated to a terminal by 4 bits, in which there are four reserved states. For another example, to reduce the bit overheads of the time domain resource allocation, in the standard, 16 manners among the 28 time domain resource allocation manners are defined as default time domain resource allocation pattern manners for the RMSI, and correspondingly, the currently used time domain resource allocation pattern for the PDSCH is indicated to the terminal by 4 bits.

TABLE 8

| RA(i) | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | Dd | Dd | Dd | Dd | Dd | Dd | Dd | Dd | Dd | Dd | Dd | Dd |
| 1 | | | Dd | Dd | Dd | Dd | Dd | Dd | Dd | Dd | Dd | Dd | | |
| 2 | | | Dd | Dd | Dd | Dd | Dd | Dd | Dd | Dd | | | | |
| 3 | | | Dd | Dd | Dd | Dd | Dd | Dd | Dd | | | | | |

TABLE 8-continued

| RA(i) | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 4 | | | Dd | Dd | Dd | Dd | Dd | Dd | | | | | | |
| 5 | | | Dd | Dd | Dd | Dd | Dd | | | | | | | |
| 6 | | | Dd | Dd | Dd | Dd | | | | | | | | |
| 7 | | | Dd | Dd | | | | | | | | | Dd | Dd |
| 8 | | | Dd | Dd | | | | | | | | | | |
| 9 | | | | | Dd | Dd | Dd | Dd | Dd | Dd | Dd | Dd | Dd | Dd |
| 10 | | | | Dd | Dd | Dd | Dd | Dd | Dd | Dd | Dd | Dd | | |
| 11 | | | | Dd | Dd | Dd | Dd | Dd | Dd | Dd | | | | |
| 12 | | | | Dd | Dd | Dd | Dd | Dd | Dd | | | | | |
| 13 | | | | Dd | Dd | Dd | Dd | Dd | | | | | | |
| 14 | | | | Dd | Dd | Dd | Dd | Dd | | | | | | |
| 15 | | | | Dd | Dd | Dd | Dd | | | | | | | |
| 16 | | | | Dd | | | | | | | | | Dd | Dd |

TABLE 8-continued

| RA(i) | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 17 | | | | | Dd | Dd | Dd | Dd | | | | | | |
| 18 | | | | | Dd | Dd | Dd | Dd | Dd | Dd | Dd | | | |
| 19 | | | | | Dd | Dd | Dd | Dd | Dd | Dd | Dd | Dd | | |
| 20 | | | | | Dd | Dd | Dd | Dd | Dd | Dd | Dd | Dd | Dd | Dd |
| 21 | | | | | Dd | Dd | Dd | Dd | | | | | | |
| 22 | | | | | | Dd | Dd | Dd | Dd | Dd | Dd | | | |
| 23 | | | | | | Dd | Dd | Dd | Dd | Dd | Dd | Dd | | |
| 24 | | | | | | | Dd | Dd | Dd | Dd | Dd | | | |
| 25 | | | | | | | | Dd | Dd | Dd | Dd | Dd | | |
| 26 | | | | | | | | | Dd | Dd | Dd | Dd | | |
| 27 | | | | | | | | | | | | | Dd | Dd |

Implementation three: SCS{SSB, RMSI}={30, 15} kHz

In a case where the subcarrier spacing (SCS) combination {SSB, RMSI}={30, 15} kHz, Table 9 shows mapping locations of SSBs mapping pattern 1 in a slot, and possible locations of an RMSI search space (that is, Dc denotes a symbol where the RMSI search space is located in the slot). Based on this, Table 9 shows time domain allocation patterns for an RMSI PDSCH in a case where there are some or all SSBs. Indexs of search space locations refer to Table 3. In view of space location 1, 2, 4 or 10, symbol locations do not exceed the second symbol, the search space locations 1, 2, 4 and 10 are considered as a classification. In view of the last symbol of search space location 3, 5 or 6 is the third symbol, the search space locations 3, 5 and 6 are considered as a classification. In a case where the slot includes two search spaces, a second search space is denoted in bold. SSB denotes symbols onto which an SSB is mapped. Dd denotes a symbol occupied by the PDSCH. In a case where a slot contains two search spaces, a symbol in the second search space, occupied by the PDSCH and allocated by a PDCCH is denoted in bold.

TABLE 9

| Search Space Location | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| SSB Pattern 1 | | | SSB0 | | | SSB1 | | | SSB2 | | SSB3 | | | |
| 1, 2, 4, 10 | | Dc | SSB | Dd | Dd | | | | | | | | | |
| | | Dc | SSB | Dd | Dd | Dd | Dd | | | | | | | |
| | | Dc | SSB | Dd | Dd | Dd | Dd | Dd | Dd | Dd | | | | |
| | | Dc | SSB | Dd | Dd | Dd | Dd | Dd | Dd | Dd | Dd | | | |
| | | Dc | SSB | Dd | Dd | Dd | Dd | Dd | Dd | Dd | Dd | Dd | Dd | |
| 7 | Dc | Dc | SSB | Dd | Dd | Dd | Dd | Dd | Dd | Dd | Dd | | | |
| | Dc | Dc | SSB | Dd | Dd | Dd | Dd | Dd | Dd | Dd | Dd | Dd | Dd | |
| 1, 2, 4, 10 | | Dc | Dd | Dd | SSB | | | | | | | | | |
| | | Dc | Dd | Dd | SSB | Dd | Dd | | | | | | | |
| | | Dc | | | SSB | Dd | Dd | Dd | Dd | | | | | |
| | | Dc | | | SSB | Dd | Dd | Dd | Dd | Dd | Dd | Dd | | |
| | | Dc | Dd | Dd | SSB | Dd | Dd | Dd | Dd | Dd | | | | |
| | | Dc | Dd | Dd | SSB | Dd | Dd | Dd | Dd | Dd | Dd | | | |
| | | Dc | Dd | Dd | SSB | Dd | Dd | Dd | Dd | Dd | Dd | Dd | Dd | |
| 3, 5, 6 | | | Dc | | SSB | Dd | Dd | Dd | Dd | | | | | |
| | | | Dc | | SSB | Dd | Dd | Dd | Dd | Dd | Dd | | | |
| | | | Dc | Dd | SSB | Dd | Dd | Dd | Dd | Dd | Dd | | | |
| | | | Dc | | SSB | Dd | Dd | Dd | Dd | Dd | Dd | Dd | Dd | |
| | | | Dc | Dd | SSB | Dd | Dd | Dd | Dd | Dd | Dd | Dd | Dd | |
| 7 | Dc | Dc | | | SSB | Dd | Dd | Dd | Dd | Dd | Dd | Dd | Dd | |
| | Dc | Dc | Dd | Dd | SSB | Dd | Dd | Dd | Dd | Dd | Dd | | | |
| | Dc | Dc | Dd | Dd | SSB | Dd | Dd | Dd | Dd | Dd | Dd | Dd | Dd | |
| 8 | Dc | Dc | Dc | Dc | SSB | Dd | Dd | Dd | Dd | Dd | Dd | Dd | Dd | |
| 11 | | | Dc | Dc | SSB | Dd | Dd | Dd | Dd | | | | | |
| | | | Dc | Dc | SSB | Dd | Dd | Dd | Dd | Dd | Dd | Dd | | |
| | | | Dc | Dc | SSB | Dd | Dd | Dd | Dd | Dd | Dd | Dd | Dd | |
| | Dd | Dd | Dc | Dc | SSB | Dd | Dd | Dd | Dd | Dd | Dd | Dd | Dd | |
| | Dd | Dd | Dc | Dc | SSB | Dd | Dd | Dd | Dd | Dd | Dd | | | |
| 1, 2, 4, 10 | | Dc | Dd | Dd | Dd | Dd | Dd | Dd | SSB | | | | | |
| | | Dc | Dd | Dd | Dd | Dd | Dd | Dd | SSB | | Dd | Dd | Dd | Dd |
| | | Dc | Dd | Dd | Dd | Dd | Dd | Dd | SSB | | Dd | Dd | | |
| 3, 5, 6 | | | Dc | Dd | Dd | Dd | Dd | Dd | SSB | | | | | |
| | | | Dc | Dd | Dd | Dd | Dd | Dd | SSB | | Dd | Dd | | |
| | | | Dc | Dd | Dd | Dd | Dd | Dd | SSB | | Dd | Dd | Dd | Dd |
| 7 | Dc | Dc | Dd | Dd | Dd | Dd | Dd | Dd | SSB | | Dd | Dd | Dd | Dd |
| | Dc | Dc | Dd | Dd | Dd | Dd | Dd | Dd | SSB | | Dd | Dd | Dd | Dd |
| 8 | Dc | Dc | Dc | Dc | Dd | Dd | Dd | Dd | SSB | | Dd | Dd | Dd | Dd |
| 9 | Dc | Dc | Dc | Dc | Dc | Dc | Dd | Dd | SSB | | Dd | Dd | | |
| | Dc | Dc | Dc | Dc | Dc | Dc | Dd | Dd | SSB | | Dd | Dd | Dd | Dd |
| | Dc | Dc | Dc | Dc | Dc | Dc | Dd | Dd | SSB | | Dd | Dd | Dd | Dd |
| 11 | | | Dc | Dc | Dd | Dd | Dd | Dd | SSB | | | | | |
| | | | Dc | Dc | Dd | Dd | Dd | Dd | SSB | | Dd | Dd | Dd | Dd |
| | Dd | Dd | Dc | Dc | Dd | Dd | Dd | Dd | SSB | | | | | |
| | Dd | Dd | Dc | Dc | Dd | Dd | Dd | Dd | SSB | | Dd | Dd | Dd | Dd |
| | Dd | Dd | Dc | Dc | | | | | SSB | | Dd | Dd | Dd | Dd |
| 12 | | | Dc | Dc | Dc | Dd | Dd | Dd | SSB | | Dd | Dd | | |
| | | | Dc | Dc | Dc | | | | SSB | | Dd | Dd | Dd | Dd |
| | | | Dc | Dc | Dc | Dd | Dd | Dd | SSB | | Dd | Dd | Dd | Dd |
| | Dd | Dd | Dd | Dc | Dc | Dc | Dd | Dd | SSB | | Dd | Dd | Dd | Dd |
| | Dd | Dd | Dd | Dc | Dc | Dc | Dd | Dd | SSB | | | | | |
| 1, 2, 4, 10 | | Dc | Dd | Dd | Dd | Dd | Dd | Dd | Dd | Dd | SSB | | | |
| | | Dc | Dd | Dd | Dd | Dd | Dd | Dd | Dd | Dd | SSB | Dd | Dd | |
| 3, 5, 6 | | | Dc | Dd | Dd | Dd | Dd | Dd | Dd | Dd | SSB | | | |
| | | | Dc | Dd | Dd | Dd | Dd | Dd | Dd | Dd | SSB | Dd | Dd | |
| 7 | Dc | Dc | Dd | Dd | Dd | Dd | Dd | Dd | Dd | Dd | SSB | | | |
| | Dc | Dc | Dd | Dd | Dd | Dd | Dd | Dd | Dd | Dd | SSB | Dd | Dd | |
| 8 | Dc | Dc | Dc | Dc | Dd | Dd | Dd | Dd | Dd | Dd | SSB | | | |
| | Dc | Dc | Dc | Dc | Dd | Dd | Dd | Dd | Dd | Dd | SSB | Dd | Dd | |
| 9 | Dc | Dc | Dc | Dc | Dc | Dc | Dd | Dd | Dd | Dd | SSB | | | |
| | Dc | Dc | Dc | Dc | Dc | Dc | Dd | Dd | Dd | Dd | SSB | Dd | Dd | |
| 11 | | | Dc | Dc | Dd | Dd | Dd | Dd | Dd | Dd | SSB | | | |

TABLE 9-continued

| Search Space Location | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
|  |  |  | Dc | Dc | Dd | Dd | Dd | Dd | Dd | Dd |  | SSB | Dd | Dd |
|  | Dd | Dd | Dc | Dc | Dd | Dd | Dd | Dd | Dd | Dd |  | SSB |  |  |
|  | Dd | Dd | Dc | Dc | Dd | Dd | Dd | Dd | Dd | Dd |  | SSB | Dd | Dd |

Table 10 shows mapping locations of SSB mapping pattern 1 in a slot, and possible locations of an RMSI search space (that is, Dc denotes a symbol where the RMSI search space is located in the slot). Based on this, time domain allocation patterns for an RMSI PDSCH in a case where there are some or all SSBs are further given.

When SSB0 is actually transmitted, search space location 1 is equivalent to search space location 3 without an SSB, which is not specifically listed in Table 10.

TABLE 10

Only locations of SSB0 and SSB3 are different from that in pattern 1.

| Search Space Location | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| SSB Pattern 2 |  |  | SSB0 |  |  | SSB1 |  |  | SSB2 |  |  | SSB3 |  |  |
| 1 | Dc |  | SSB |  |  |  |  |  |  |  |  |  |  |  |
| 12 |  |  | SSB | Dc | Dc | Dc | Dd | Dd | Dd | Dd |  |  |  |  |
|  |  |  | SSB | Dc | Dc | Dc | Dd | Dd | Dd | Dd | Dd | Dd |  |  |
|  |  |  | SSB | Dc | Dc | Dc | Dd | Dd | Dd | Dd | Dd | Dd | Dd |  |
| 1, 2, 4, 10 |  | Dc | Dd | Dd | Dd | Dd | Dd | Dd | Dd | Dd |  | SSB |  |  |
|  |  | Dc | Dd | Dd | Dd | Dd | Dd | Dd | Dd | Dd |  | SSB | Dd |  |
| 3, 5, 6 |  |  | Dc | Dd | Dd | Dd | Dd | Dd | Dd | Dd |  | SSB |  |  |
|  |  |  | Dc | Dd | Dd | Dd | Dd | Dd | Dd | Dd |  | SSB | Dd |  |
| 7 | Dc | Dc | Dd | Dd | Dd | Dd | Dd | Dd | Dd | Dd |  | SSB |  |  |
|  | Dc | Dc | Dd | Dd | Dd | Dd | Dd | Dd | Dd | Dd |  | SSB |  |  |
|  | Dc | Dc | Dd | Dd | Dd | Dd | Dd | Dd | Dd | Dd |  | SSB | Dd |  |
| 8 | Dc | Dc | Dc | Dc | Dd | Dd | Dd | Dd | Dd | Dd | Dd | SSB | Dd |  |
| 9 | Dc | Dc | Dc | Dc | Dc | Dc | Dd | Dd | Dd | Dd |  | SSB |  |  |
|  | Dc | Dc | Dc | Dc | Dc | Dc | Dd | Dd | Dd | Dd |  | SSB | Dd |  |
|  | Dc | Dc | Dc | Dc | Dc | Dc | Dd | Dd | Dd | Dd |  | SSB | Dd |  |
| 11 |  |  | Dc | Dc | Dd | Dd | Dd | Dd | Dd | Dd |  | SSB |  |  |
|  |  |  | Dc | Dc | Dd | Dd | Dd | Dd | Dd | Dd |  | SSB | Dd |  |
|  | Dd | Dd | Dc | Dc | Dd | Dd | Dd | Dd | Dd | Dd |  | SSB | Dd |  |
|  | Dd | Dd | Dc | Dc | Dd | Dd | Dd | Dd | Dd | Dd |  | SSB |  |  |
| 12 |  |  | Dc | Dc | Dc | Dd | Dd | Dd | Dd |  |  | SSB |  |  |
|  |  |  | Dc | Dc | Dc | Dd | Dd | Dd | Dd | Dd |  | SSB | Dd |  |
|  | Dd | Dd | Dd | Dc | Dc | Dc | Dd | Dd | Dd | Dd |  | SSB |  |  |
|  | Dd | Dd | Dd | Dc | Dc | Dc | Dd | Dd | Dd | Dd |  | SSB | Dd |  |
| 1, 2, 4, 10 |  | Dc | Dd | Dd |  | SSB | Dd | Dd |  | SSB | Dd | Dd | Dd | Dd |
|  |  | Dc | Dd | Dd |  | SSB | Dd | Dd |  | SSB |  |  |  |  |
|  |  | Dc | Dd | Dd |  | SSB |  |  |  | SSB |  |  |  |  |
|  |  | Dc |  |  |  | SSB |  |  |  | SSB | Dd | Dd | Dd | Dd |
| 3, 5, 6 |  |  | Dc |  |  | SSB |  |  |  | SSB | Dd | Dd | Dd | Dd |
|  |  |  | Dc | Dd |  | SSB | Dd | Dd |  | SSB | Dd | Dd | Dd | Dd |
| 7 | Dc | Dc | Dd | Dd |  | SSB | Dd | Dd |  | SSB |  |  |  |  |
|  | Dc | Dc | Dd | Dd |  | SSB | Dd | Dd |  | SSB | Dd | Dd | Dd | Dd |
| 8 | Dc | Dc | Dc | Dc |  | SSB | Dd | Dd |  | SSB | Dd | Dd | Dd | Dd |
|  | Dc | Dc | Dc | Dc |  | SSB | Dd | Dd |  | SSB | Dd | Dd | Dd | Dd |
|  | Dc | Dc | Dc | Dc |  | SSB | Dd | Dd |  | SSB | Dd | Dd | Dd | Dd |
| 11 |  |  | Dc | Dc |  | SSB | Dd | Dd |  | SSB | Dd | Dd | Dd | Dd |
|  | Dd | Dd | Dc | Dc |  | SSB | Dd | Dd |  | SSB | Dd | Dd | Dd | Dd |
|  | Dd | Dd | Dc | Dc |  | SSB | Dd | Dd |  | SSB |  |  |  |  |
|  | Dd | Dd | Dc | Dc |  | SSB |  |  |  | SSB | Dd | Dd | Dd | Dd |

Possible time domain resource allocation patterns in a case where the slot RMSI located contains no SSB still refer to Table 5.

When labels of Dc symbols and SSB symbols in Tables 10, 9 and 5 are hided and only labels of PDSCH symbols (that is, Dd) in Tables 10, 9 and 5 are retained, each row in Tables 9, 10 and 5 corresponds to a time domain resource allocation pattern. That is, a set of symbols labeled Dd in each row is defined as a time domain resource allocation pattern. Identical resource allocation patterns are merged and a time domain resource allocation table as shown in Table 11 is obtained. Table 8 shows possible time domain resource allocation manners in a case where SCS combination {SSB, RMSI}={30, 15} kHz. There are 62 manners in total. Several manners may be selected from among the 62 manners, and the time domain allocation may be indicated by the corresponding number of bits in an RMSI PDCCH. For example, in the standard, currently used time domain resource allocation pattern set for the PDSCH is indicated to a terminal by 6 bits, in which there are two reserved state. For another example, to reduce the bit overheads of the time domain resource allocation, in the standard, 16 manners among the 62 time domain resource allocation manners are defined as default time domain resource allocation pattern manners for the RMSI, and correspondingly, the currently used time domain resource allocation pattern for the PDSCH is indicated to the terminal by 4 bits.

Additionally, Table 11 shows a universal set of time domain resource allocation for the RMSI PDSCH in the subcarrier spacing combination {SSB, RMSI}={30, 15} kHz. Alternatively, time domain resource allocation tables for the RMSI PDSCH may be defined for different mapping patterns (that is, pattern 1 and pattern 2) of the 30 kHz SSB respectively, so as to reduce the overheads of indication.

Additionally, separate resource allocation tables are defined for different search space types. For example, different time domain resource allocation tables are defined according to the following cases: a slot contains only one search space; a slot contains two search spaces, and the PDCCH is contained within the first search space of the two search spaces; and a slot contains two search spaces, and the PDCCH is contained within the second search space of the two search spaces.

TABLE 11

| RA(i) | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 1 | Dd | Dd | Dd | | | Dd | Dd | | | | | | | |
| 2 | Dd | Dd | Dd | | | Dd | Dd | | | Dd | Dd | Dd | Dd | |
| 3 | Dd | Dd | Dd | | | Dd | Dd | Dd | Dd | Dd | | | | |
| 4 | Dd | Dd | Dd | | | Dd | Dd | Dd | Dd | Dd | | | | Dd |
| 5 | Dd | Dd | | | | Dd | Dd | | | | | | | |
| 6 | Dd | Dd | | | | Dd | Dd | | | Dd | Dd | Dd | Dd | |
| 7 | Dd | Dd | | Dd | Dd | Dd | Dd | Dd | Dd | | | | | |
| 8 | Dd | Dd | | Dd | Dd | Dd | Dd | Dd | Dd | | | Dd | Dd | |
| 9 | Dd | Dd | | | | | | | | | Dd | Dd | Dd | Dd |
| 10 | Dd | Dd | | | Dd | Dd | Dd | Dd | Dd | Dd | Dd | | | |
| 11 | Dd | Dd | | | Dd | Dd | Dd | Dd | Dd | Dd | | | | Dd |
| 12 | Dd | Dd | | | Dd | Dd | Dd | Dd | | | Dd | Dd | Dd | Dd |
| 13 | Dd | Dd | | | Dd | Dd | Dd | Dd | | | | | | |
| 14 | Dd | Dd | | | | | Dd | Dd | Dd | Dd | Dd | Dd | Dd | Dd |
| 15 | Dd | Dd | | | | | Dd | Dd | Dd | Dd | Dd | Dd | Dd | |
| 16 | | Dd | Dd | Dd | Dd | Dd | Dd | Dd | Dd | Dd | Dd | Dd | Dd | Dd |
| 17 | | Dd | Dd | Dd | Dd | Dd | Dd | Dd | Dd | Dd | Dd | | | |
| 18 | | Dd | Dd | Dd | Dd | Dd | Dd | Dd | Dd | Dd | | | | |
| 19 | | Dd | Dd | Dd | Dd | Dd | Dd | Dd | Dd | | | | | Dd |
| 20 | | Dd | Dd | Dd | Dd | Dd | Dd | Dd | Dd | | | | Dd | Dd |
| 21 | | Dd | Dd | Dd | Dd | Dd | Dd | Dd | | | | | | |
| 22 | | Dd | Dd | Dd | Dd | Dd | Dd | | | | | | | |
| 23 | | Dd | Dd | Dd | Dd | Dd | | | | | | | | |
| 24 | | Dd | Dd | Dd | Dd | | | | | | | | | |
| 25 | | Dd | Dd | | | Dd | Dd | | | Dd | Dd | Dd | Dd | |
| 26 | | Dd | Dd | | | Dd | Dd | | | | | | | |
| 27 | | Dd | Dd | | | | | | | | | | | |
| 28 | | | | Dd | Dd | Dd | Dd | Dd | Dd | Dd | Dd | Dd | Dd | |
| 29 | | | | Dd | Dd | Dd | Dd | Dd | Dd | Dd | Dd | Dd | | |
| 30 | | | | Dd | Dd | Dd | Dd | Dd | Dd | Dd | Dd | | | |
| 31 | | | | Dd | Dd | Dd | Dd | Dd | Dd | Dd | | | | Dd |
| 32 | | | | Dd | Dd | Dd | Dd | Dd | Dd | | | | Dd | Dd |
| 33 | | | | Dd | Dd | Dd | Dd | Dd | Dd | | | | | |
| 34 | | | | Dd | Dd | Dd | Dd | Dd | | | | | | |
| 35 | | | | Dd | Dd | Dd | Dd | Dd | | | | | | |
| 36 | | | | Dd | Dd | Dd | Dd | | | | | | | |
| 37 | | | | Dd | Dd | Dd | Dd | | | | | | | |
| 38 | | | | Dd | Dd | Dd | Dd | Dd | | | | | | |
| 39 | | | | Dd | Dd | Dd | Dd | Dd | Dd | Dd | | | | |
| 40 | | | | Dd | Dd | Dd | Dd | Dd | Dd | Dd | | | | Dd |
| 41 | | | | Dd | Dd | Dd | Dd | Dd | Dd | Dd | Dd | | | |
| 42 | | | | Dd | Dd | Dd | Dd | Dd | Dd | Dd | Dd | Dd | Dd | |
| 43 | | | | | Dd | Dd | Dd | Dd | | | | | | |
| 44 | | | | | Dd | Dd | Dd | Dd | Dd | Dd | Dd | | | |
| 45 | | | | | Dd | Dd | Dd | Dd | Dd | Dd | Dd | Dd | Dd | |
| 46 | | | | | Dd | Dd | Dd | Dd | Dd | | | | | Dd |
| 47 | | | | | Dd | Dd | Dd | | | | | | | |
| 48 | | | | | Dd | Dd | | | | | | | | |
| 49 | | | | | Dd | Dd | | | | Dd | | | | |
| 50 | | | | | Dd | Dd | | | | Dd | Dd | | | |
| 51 | | | | | | Dd | Dd | Dd | Dd | | | | | |
| 52 | | | | | | Dd | Dd | Dd | Dd | | | | | Dd |
| 53 | | | | | | Dd | Dd | Dd | | | | | Dd | Dd |
| 54 | | | | | | Dd | | | | Dd | Dd | Dd | Dd | |
| 55 | | | | | | Dd | Dd | Dd | Dd | Dd | Dd | | | |
| 56 | | | | | | Dd | Dd | | | | | | | |
| 57 | | | | | | | | | | Dd | Dd | Dd | Dd | Dd |
| 58 | | | | | | | | | | Dd | Dd | | | Dd |
| 59 | | | | | | | | | | Dd | | | Dd | Dd |
| 60 | | | | | | | | | | | Dd | Dd | Dd | Dd |
| 61 | | | | | | | | | | | | Dd | Dd | Dd |
| 62 | | | | | | | | | | | | | Dd | Dd |

Implementation four: SCS {SSB, RMSI}={30, 30} kHz

In the case where the subcarrier spacing (SCS) combination {SSB, RMSI}={30, 30} kHz, Tables 12 and 13 show mapping locations of SSB mapping pattern 1 in a slot, and possible locations of an RMSI search space (that is, Dc denotes a symbol where the RMSI search space is located in the slot). Based on this, time domain allocation patterns for an RMSI PDSCH in a case where there are some or all SSBs are further given. Indexes of search space locations refer to Table 3. In view of space location 1, 2, 4 or 10, symbol locations do not exceed the second symbol, the search space locations 1, 2, 4 and 10 are considered as a classification. In view of the last symbol of search space location 3, 5 or 6 is the third symbol, the search space locations 3, 5 and 6 are considered as a classification. In a case where the slot includes two search spaces, a second search space is denoted in bold. SSB denotes symbols onto which an SSB is mapped. Dd denotes a symbol occupied by the PDSCH. In a case where a slot contains two search spaces, a symbol in the second search space, occupied by the PDSCH and allocated by a PDCCH is denoted in bold.

TABLE 12

| Search Space Location | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| SSB in a First Slot | | | | | | SSB0 | | | | SSB1 | | | | |
| 1, 2, 4, 10 | | Dc | Dd | Dd | | SSB0 | | | | SSB1 | | | Dd | Dd |
| 3, 5, 6 | | | Dc | | | SSB0 | | | | SSB1 | | | Dd | Dd |
| | | | Dc | Dd | | SSB0 | | | | SSB1 | | | Dd | Dd |
| 7 | Dc | Dc | Dd | Dd | | SSB0 | | | | SSB1 | | | Dd | Dd |
| 8 | Dc | Dc | Dc | Dc | | SSB0 | | | | SSB1 | | | Dd | Dd |
| 11 | | | Dc | Dc | | SSB0 | | | | SSB1 | | | Dd | Dd |
| | Dd | Dd | Dc | Dc | | SSB0 | | | | SSB1 | | | Dd | Dd |
| 1, 2, 4, 10 | | Dc | Dd | Dd | | SSB0 | | | Dd | Dd | | | | |
| | | Dc | | | | SSB0 | | | Dd | Dd | Dd | Dd | | |
| | | Dc | Dd | Dd | | SSB0 | | | Dd | Dd | Dd | Dd | | |
| | | Dc | Dd | Dd | | SSB0 | | | Dd | Dd | Dd | Dd | Dd | |
| 3, 5, 6 | | | Dc | | | SSB0 | | | Dd | Dd | Dd | Dd | | |
| | | | Dc | Dd | | SSB0 | | | Dd | Dd | Dd | Dd | Dd | |
| 7 | Dc | Dc | Dd | Dd | | SSB0 | | | Dd | Dd | Dd | Dd | Dd | Dd |

TABLE 12-continued

| Search Space Location | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 8 | Dc | Dc | Dc | Dc | | SSB0 | | | Dd | Dd | Dd | Dd | Dd | Dd |
| | Dc | Dc | Dc | Dc | | SSB0 | | | Dd | Dd | Dd | Dd | Dd | Dd |
| 11 | | | Dc | Dc | | SSB0 | | | Dd | Dd | Dd | Dd | | |
| | Dd | Dd | Dc | Dc | | SSB0 | | | Dd | Dd | Dd | Dd | | |
| | | | Dc | Dc | | SSB0 | | | Dd | Dd | Dd | Dd | Dd | Dd |
| | Dd | Dd | Dc | Dc | | SSB0 | | | Dd | Dd | Dd | Dd | Dd | Dd |
| 1, 2, 4, 10 | | Dc | Dd | Dd | Dd | Dd | Dd | Dd | | SSB1 | | | | |
| | | Dc | Dd | Dd | Dd | Dd | Dd | Dd | | SSB1 | | | Dd | Dd |
| 3, 5, 6 | | | Dc | Dd | Dd | Dd | Dd | Dd | | SSB1 | | | | |
| | | | Dc | Dd | Dd | Dd | Dd | Dd | | SSB1 | | | Dd | Dd |
| 7 | Dc | Dc | Dd | Dd | Dd | Dd | Dd | Dd | | SSB1 | | | Dd | Dd |
| 8 | Dc | Dc | Dc | Dc | Dd | Dd | Dd | Dd | | SSB1 | | | Dd | Dd |
| | Dc | Dc | Dc | Dc | Dd | Dd | Dd | Dd | | SSB1 | | | Dd | Dd |
| 11 | | | Dc | Dc | Dd | Dd | Dd | Dd | | SSB1 | | | | |
| | | | Dc | Dc | Dd | Dd | Dd | Dd | | SSB1 | | | Dd | Dd |
| | Dd | Dd | Dc | Dc | Dd | Dd | Dd | Dd | | SSB1 | | | | |
| | Dd | Dd | Dc | Dc | Dd | Dd | Dd | Dd | | SSB1 | | | Dd | Dd |

TABLE 13

| Search Space Location | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| SSB in a Second Slot | | | | | SSB0 | | | | SSB1 | | | | | |
| 1, 2, 4, 10 | | Dc | | | SSB0 | | | | SSB1 | | Dd | Dd | Dd | Dd |
| 7 | Dc | Dc | | | SSB0 | | | | SSB1 | | Dd | Dd | Dd | Dd |
| 1, 2, 4, 10 | | Dc | | | SSB0 | | Dd | Dd | | | | | | |
| | | Dc | | | SSB0 | | Dd | Dd | Dd | Dd | | | | |
| | | Dc | | | SSB0 | | Dd | Dd | Dd | Dd | Dd | Dd | | |
| | | Dc | | | SSB0 | | Dd | Dd | Dd | Dd | Dd | Dd | Dd | Dd |
| 7 | Dc | Dc | | | SSB0 | | Dd | Dd | Dd | Dd | Dd | Dd | Dd | Dd |
| 1, 2, 4, 10 | | Dc | Dd | Dd | Dd | Dd | | | SSB1 | | | | | |
| | | Dc | Dd | Dd | Dd | Dd | | | SSB1 | | Dd | Dd | Dd | Dd |
| 3, 5, 6 | | | Dc | Dd | Dd | Dd | | | SSB1 | | | | | |
| | | | Dc | | | | | | SSB1 | | Dd | Dd | Dd | Dd |
| | | | Dc | Dd | Dd | Dd | | | SSB1 | | Dd | Dd | Dd | Dd |
| 7 | Dc | Dc | Dd | Dd | Dd | Dd | | | SSB1 | | Dd | Dd | Dd | Dd |
| 8 | Dc | Dc | Dc | Dc | Dd | Dd | | | SSB1 | | Dd | Dd | Dd | Dd |
| | Dc | Dc | Dc | Dc | Dd | Dd | | | SSB1 | | Dd | Dd | Dd | Dd |
| 11 | | | Dc | Dc | Dd | Dd | | | SSB1 | | | | | |
| | | | Dc | Dc | | | | | SSB1 | | Dd | Dd | Dd | Dd |
| | | | Dc | Dc | Dd | Dd | | | SSB1 | | Dd | Dd | Dd | Dd |
| | Dd | Dd | Dc | Dc | Dd | Dd | | | SSB1 | | | | | |
| | Dd | Dd | Dc | Dc | Dd | Dd | | | SSB1 | | Dd | Dd | Dd | Dd |

Possible time domain resource allocation patterns in a case where the slot RMSI located contains no SSB still refer to Table 5.

When labels of Dc symbols and SSB symbols in Tables 12, 13 and 5 are hided and only labels of PDSCH symbols (that is, Dd) in Tables 12, 13 and 5 are retained, each row in Tables 12, 13 and 5 corresponds to a time domain resource allocation pattern. That is, a set of symbols labeled Dd in each row is defined as a time domain resource allocation pattern. Identical resource allocation patterns are merged and a time domain resource allocation table as shown in Table 14 is obtained. In a case where SCS combination {SSB, RMSI}={30, 30} kHz, there are 53 possible time domain resource allocation manners in total. Several manners may be selected from among the 53 manners, and the time domain allocation may be indicated by the corresponding number of bits in an RMSI PDCCH. For example, in the standard, currently used time domain resource allocation pattern set for the PDSCH is indicated to a terminal by 6 bits, in which there are 11 reserved states. For another example, to reduce the bit overheads of the time domain resource allocation, in the standard, 16 manners among the 53 time domain resource allocation manners are defined as default time domain resource allocation manners for the RMSI, and correspondingly, the currently used time domain resource allocation pattern for the PDSCH is indicated to the terminal by 4 bits.

In implementation one of 30 kHz SSB pattern 2, the time domain resource allocation is the same as that in a case where the subcarrier spacing combination {SSB, RMSI}={15, 15} kHz. Table 6 may be reused as a universal set of time domain resource allocation configurations of 30 kHz SSB pattern 2.

TABLE 14

| RA(i) | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | Dd | Dd | | | | | | | | | | | Dd | Dd |
| 1 | Dd | Dd | | | | | | | Dd | Dd | Dd | Dd | | |
| 2 | Dd | Dd | | | | | | | Dd | Dd | Dd | Dd | Dd | Dd |
| 3 | Dd | Dd | | | Dd | Dd | Dd | Dd | | | | | Dd | Dd |
| 4 | Dd | Dd | | | Dd | Dd | Dd | Dd | | | | | | |
| 5 | Dd | Dd | | | Dd | Dd | | | | | | | | |
| 6 | Dd | Dd | | | Dd | Dd | | | | | Dd | Dd | Dd | Dd |
| 7 | | | Dd | Dd | | | | | | | | | Dd | Dd |
| 8 | | | Dd | Dd | | | | | Dd | Dd | | | | |
| 9 | | | Dd | Dd | | | | | Dd | Dd | Dd | Dd | Dd | Dd |

TABLE 14-continued

| RA(i) | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 10 | | Dd | Dd | | | | | Dd | Dd | Dd | Dd | Dd | Dd | |
| 11 | | Dd | Dd | Dd | Dd | Dd | Dd | Dd | Dd | Dd | Dd | Dd | | |
| 12 | | Dd | Dd | Dd | Dd | Dd | Dd | Dd | Dd | Dd | Dd | | | |
| 13 | | Dd | Dd | Dd | Dd | Dd | Dd | Dd | Dd | | | | | |
| 14 | | Dd | Dd | Dd | Dd | Dd | Dd | Dd | Dd | | | | | |
| 15 | | Dd | Dd | Dd | Dd | Dd | Dd | | | | | | | |
| 16 | | Dd | Dd | Dd | Dd | Dd | Dd | | | | | Dd | Dd | |
| 17 | | Dd | Dd | Dd | Dd | Dd | | | | | | | | |
| 18 | | Dd | Dd | Dd | Dd | | | | | | | | | |
| 19 | | Dd | Dd | Dd | Dd | | | | | | Dd | Dd | Dd | Dd |
| 20 | | | Dd | Dd | Dd | Dd | Dd | Dd | Dd | Dd | Dd | Dd | Dd | |
| 21 | | | Dd | Dd | Dd | Dd | Dd | Dd | Dd | Dd | Dd | | | |
| 22 | | | Dd | Dd | Dd | Dd | Dd | Dd | Dd | | | | | |
| 23 | | | Dd | Dd | Dd | Dd | Dd | Dd | Dd | | | | | |
| 24 | | | Dd | Dd | Dd | Dd | Dd | Dd | | | | | | |
| 25 | | | Dd | Dd | Dd | Dd | Dd | | | | | | | |
| 26 | | | Dd | Dd | Dd | Dd | Dd | | | | | Dd | Dd | |
| 27 | | | Dd | Dd | Dd | Dd | | | | | | | | |
| 28 | | | Dd | | | | | | | | | Dd | Dd | |
| 29 | | | | Dd | Dd | Dd | | | | | | | | |
| 30 | | | | Dd | Dd | Dd | Dd | | | | | | | |
| 31 | | | | Dd | Dd | Dd | Dd | Dd | | | | | | |
| 32 | | | | Dd | Dd | Dd | Dd | Dd | Dd | Dd | | | | |
| 33 | | | | Dd | Dd | Dd | Dd | Dd | Dd | Dd | Dd | | | |
| 34 | | | | Dd | Dd | Dd | Dd | Dd | Dd | Dd | Dd | Dd | Dd | |
| 35 | | | | Dd | Dd | Dd | Dd | | | | | Dd | Dd | |
| 36 | | | | Dd | Dd | | | | | Dd | | | | |
| 37 | | | | Dd | Dd | | | | | Dd | Dd | Dd | Dd | |
| 38 | | | | | Dd | Dd | | | | | | | | |
| 39 | | | | | Dd | Dd | Dd | Dd | | | | | | |
| 40 | | | | | Dd | Dd | Dd | Dd | Dd | Dd | Dd | | | |
| 41 | | | | | Dd | Dd | Dd | Dd | Dd | Dd | Dd | Dd | Dd | |
| 42 | | | | | Dd | Dd | | | | | | Dd | Dd | |
| 43 | | | | | | Dd | | | | | | Dd | Dd | |
| 44 | | | | | | | Dd | Dd | Dd | Dd | Dd | Dd | | |
| 45 | | | | | | | Dd | Dd | Dd | Dd | | | | |
| 46 | | | | | | | | | | Dd | Dd | Dd | Dd | Dd |
| 47 | | | | | | | | | | | Dd | Dd | Dd | Dd |
| 48 | | | | | | | | | | | Dd | Dd | | |
| 49 | | | | | | | | | | | | Dd | Dd | Dd |
| 50 | | | | | | | | | | | | | Dd | Dd |
| 51 | | | | | | | | | | | | | Dd | |
| 52 | | | | | | | | | | | | | | Dd |

Implementation five: SCS{SSB, RMSI}={120, 60} kHz

In a case where the subcarrier spacing (SCS) combination {SSB, RMSI}={120, 60} kHz, Table 15 shows mapping locations of SSBs in a slot, and possible locations of an RMSI search space (that is, Dc denotes a symbol where the RMSI search space is located in the slot). Based on this, time domain allocation patterns for an RMSI PDSCH in a case where there are some or all SSBs are further given. In view of space location 1, 2, 4 or 10, symbol locations do not exceed the second symbol, the search space locations 1, 2, 4 and 10 are considered as a classification. In view of the last symbol of search space location 3, 5 or 6 is the third symbol, the search space locations 3, 5 and 6 are considered as a classification. In a case where the slot includes two search spaces, a second search space is denoted in bold. SSB denotes symbols onto which an SSB is mapped. Dd denotes a symbol occupied by the PDSCH. In a case where a slot contains two search spaces, a symbol in the second search space, occupied by the PDSCH and allocated by a PDCCH is denoted in bold.

The time domain resource allocation at search space locations 1 to 9 in Table 15 is the same as that of 30 kHz SSB mapping pattern 1 in implementation three, which is not repeated here.

TABLE 15

| Search Space Location | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| SSB | | | SSB0 | | SSB1 | | SSB2 | | SSB3 | | | | | |
| 1 | Dc | | | | | | | | | | | | | |
| 2 | Dc | Dc | | | | | | | | | | | | |
| 3 | Dc | Dc | Dc | | | | | | | | | | | |
| 4 | Dc | Dc | | | | | | | | | | | | |
| 5 | Dc | Dc | Dc | Dc | | | | | | | | | | |
| 6 | Dc | Dc | Dc | Dc | Dc | Dc | | | | | | | | |
| 7 | | Dc | | | | | | | | | | | | |
| 8 | | | Dc | Dc | | | | | | | | | | |
| 9 | | | Dc | Dc | Dc | | | | | | | | | |
| 10 | Dc | Dd | SSB0 | Dd | Dd | Dd | Dc | Dd | Dd | Dd | Dd | | | |
| 11 | Dc | Dc | SSB0 | Dd | Dd | Dd | Dc | Dc | Dd | Dd | Dd | Dd | | |
| | Dc | Dc | SSB0 | Dd | Dd | Dd | Dc | Dc | Dd | Dd | Dd | Dd | Dd | |
| 13 | | | SSB0 | | | | Dc | Dd | Dd | Dd | Dd | | | |
| | Dd | Dd | SSB0 | Dd | Dd | Dd | Dc | | | | | | | |
| | | | SSB0 | | | | Dc | Dd | Dd | Dd | Dd | Dd | | |
| | Dd | Dd | SSB0 | Dd | Dd | Dd | Dc | Dd | Dd | | | | | |
| | Dd | Dd | SSB0 | Dd | Dd | Dd | Dc | Dd | Dd | Dd | | | | |
| | Dd | Dd | SSB0 | Dd | Dd | Dd | Dc | Dd | Dd | Dd | Dd | | | |
| 14 | | | SSB0 | | | | Dc | Dc | Dd | Dd | Dd | Dd | | |
| | | | SSB0 | | | | Dc | Dc | Dd | Dd | Dd | Dd | Dd | |
| | Dd | Dd | SSB0 | Dd | Dd | Dd | Dc | Dc | | | | | | |
| | Dd | Dd | SSB0 | Dd | Dd | Dd | Dc | Dc | Dd | Dd | | | | |
| | Dd | Dd | SSB0 | Dd | Dd | Dd | Dc | Dc | Dd | Dd | Dd | Dd | | |
| 15 | | | SSB0 | | | | Dc | Dc | Dc | Dd | Dd | Dd | Dd | |
| 10 | Dc | Dd | Dd | Dd | SSB1 | Dd | Dc | Dd | Dd | Dd | Dd | | | |
| | Dc | Dd | Dd | Dd | SSB1 | Dd | Dc | Dd | Dd | Dd | Dd | Dd | | |
| 11 | Dc | Dc | Dd | Dd | SSB1 | Dd | Dc | Dc | Dd | Dd | Dd | Dd | | |
| | Dc | Dc | Dc | Dd | SSB1 | Dd | Dc | Dc | Dc | Dd | Dd | Dd | | |
| 12 | Dc | Dc | Dc | Dd | SSB1 | Dd | Dc | Dc | Dc | Dd | Dd | | | |
| 13 | | | | | SSB1 | | Dc | Dd | Dd | Dd | Dd | | | |
| | Dd | Dd | Dd | Dd | SSB1 | | Dc | | | | | | | |
| | Dd | Dd | Dd | Dd | SSB1 | Dd | Dc | | | | | | | |
| | Dd | Dd | Dd | Dd | SSB1 | Dd | Dc | Dd | Dd | | | | | |

TABLE 15-continued

| Search Space Location | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| | Dd | Dd | Dd | Dd | SSB1 | Dd | Dc | Dd | Dd | Dd | Dd | | | |
| | Dd | Dd | Dd | Dd | SSB1 | Dd | Dc | Dd | Dd | Dd | Dd | Dd | Dd | |
| 14 | | | | | SSB1 | | Dc | Dc | Dd | Dd | Dd | Dd | | |
| | | | | | SSB1 | | Dc | Dc | Dd | Dd | Dd | Dd | Dd | |
| | Dd | Dd | Dd | Dd | SSB1 | Dd | Dc | Dc | | | | | | |
| | Dd | Dd | Dd | Dd | SSB1 | Dd | Dc | Dc | Dd | Dd | | | | |
| | Dd | Dd | Dd | Dd | SSB1 | Dd | Dc | Dc | Dd | Dd | Dd | Dd | | |
| 15 | | | | | SSB1 | | Dc | Dc | Dc | Dd | Dd | Dd | Dd | |
| | Dd | Dd | Dd | Dd | SSB1 | | Dc | Dc | Dc | | | | | |
| | Dd | Dd | Dd | Dd | SSB1 | Dd | Dc | Dc | Dc | | | | | |
| | Dd | Dd | Dd | Dd | SSB1 | Dd | Dc | Dc | Dc | Dd | Dd | | | |
| | Dd | Dd | Dd | Dd | SSB1 | Dd | Dc | Dc | Dc | Dd | Dd | Dd | Dd | |
| 10 | | Dc | | | | | Dc | | SSB2 | Dd | Dd | Dd | Dd | |
| 13 | | | | | | | | Dc | SSB2 | Dd | Dd | Dd | Dd | |
| | Dd | Dd | Dd | Dd | Dd | Dd | Dd | Dc | SSB2 | | | | | |
| 10 | | Dc | | | | | Dc | Dd | Dd | | SSB3 | Dd | Dd | |
| 11 | | Dc | Dc | | | Dd | Dc | Dc | Dd | | SSB3 | Dd | Dd | |
| | | Dc | Dc | | | | Dc | Dc | Dd | | SSB3 | Dd | Dd | |
| 12 | | Dc | Dc | Dc | | | Dc | Dc | Dc | | SSB3 | Dd | Dd | |
| | | Dc | Dc | Dc | | | Dd | Dc | Dc | Dc | SSB3 | Dd | Dd | |
| 13 | | | | | | | | Dc | Dd | Dd | SSB3 | Dd | Dd | |
| | Dd | Dd | Dd | Dd | Dd | Dd | Dd | Dc | | | SSB3 | | | |
| 14 | | | | | | | | Dc | Dc | Dd | SSB3 | Dd | Dd | |
| | | | | | | Dd | Dc | Dc | Dd | SSB3 | Dd | Dd | | |
| | Dd | Dd | Dd | Dd | Dd | Dd | Dd | Dc | Dc | | SSB3 | | | |
| 15 | | | | | | | Dc | Dc | Dc | | SSB3 | Dd | Dd | |
| | | | | | | Dd | Dd | Dc | Dc | Dc | SSB3 | Dd | Dd | |
| | Dd | Dd | Dd | Dd | Dd | Dd | Dd | Dc | Dc | Dc | SSB3 | | | |

Possible time domain resource allocation patterns in a case where the slot RMSI located contains no SSB still refer to Table 5.

When labels of Dc symbols and SSB symbols in Tables 15 and 5 are hided and only labels of PDSCH symbols (that is, Dd) in Tables 15 and 5 are retained, each row in Tables 15 and 5 corresponds to a time domain resource allocation pattern. That is, a set of symbols labeled Dd in each row is defined as a time domain resource allocation pattern. Identical resource allocation patterns are merged and a time domain resource allocation table as shown in Table 16 is obtained. In SCS combination {SSB, RMSI}={30, 30} kHz, there are 54 possible time domain resource allocation manners. Additionally, time domain resource allocation at search space locations 1 to 9 is the same as that of 30 kHz SSB mapping pattern 1 in implementation three. The 54 manners and the resource allocation corresponding to the search space described above in Table 11 are combined together as a universal set of time domain resource allocation. Several time domain resource allocation manners may be selected from the universal set, and the time domain allocation is indicated by the corresponding number of bits in an RMSI PDCCH. For example, in the standard, the currently used time domain resource allocation for the PDSCH is indicated to a terminal by 6 bits, in which there are 11 reserved states. For another example, to reduce the bit overheads of the time domain resource allocation, in the standard, 16 manners among the several time domain resource allocation manners are defined as default time domain resource allocation manners for the RMSI, and correspondingly, the currently used time domain resource allocation pattern for the PDSCH is indicated to the terminal by 4 bits.

TABLE 16

| RA(i) | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 1 | Dd | Dd | Dd | Dd | Dd | Dd | Dd | | | | | | | |
| 2 | Dd | Dd | Dd | Dd | | | | | | | | | | |

TABLE 16-continued

| RA(i) | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 3 | Dd | Dd | Dd | Dd | | Dd | | | | | | | | |
| 4 | Dd | Dd | Dd | Dd | | Dd | | Dd | Dd | | | | | |
| 5 | Dd | Dd | Dd | Dd | | Dd | | Dd | Dd | Dd | Dd | | | |
| 6 | Dd | Dd | Dd | Dd | | Dd | | Dd | Dd | Dd | Dd | Dd | Dd | |
| 7 | Dd | Dd | Dd | Dd | | | | Dd | Dd | Dd | Dd | Dd | Dd | |
| 8 | Dd | Dd | Dd | Dd | | Dd | | | Dd | Dd | | | | |
| 9 | Dd | Dd | Dd | Dd | | Dd | | | | Dd | Dd | Dd | Dd | |
| 10 | Dd | Dd | Dd | Dd | | Dd | | | | | Dd | Dd | | |
| 11 | Dd | Dd | | | Dd | Dd | Dd | | | | | | | |
| 12 | Dd | Dd | | | Dd | Dd | Dd | | Dd | Dd | | | | |
| 13 | Dd | Dd | | | Dd | Dd | Dd | | | Dd | Dd | | | |
| 14 | Dd | Dd | | | Dd | Dd | Dd | | | Dd | Dd | Dd | Dd | |
| 15 | Dd | Dd | | | Dd | Dd | Dd | | Dd | Dd | Dd | Dd | | |
| 16 | Dd | Dd | | | Dd | Dd | Dd | | Dd | Dd | Dd | Dd | Dd | Dd |
| 17 | Dd | | | | Dd | Dd | Dd | | | | | | | |
| 18 | Dd | Dd | Dd | | | Dd | | | | | | | | |
| 19 | Dd | Dd | Dd | | | Dd | | Dd | | | | | | |
| 20 | | Dd | Dd | | | Dd | | Dd | | | | | | |
| 21 | | Dd | Dd | Dd | Dd | Dd | Dd | Dd | Dd | Dd | Dd | Dd | Dd | Dd |
| 22 | | Dd | Dd | Dd | Dd | Dd | Dd | Dd | Dd | Dd | Dd | | | |
| 23 | | Dd | Dd | Dd | Dd | Dd | Dd | Dd | Dd | Dd | | | | |
| 24 | | Dd | Dd | Dd | Dd | Dd | Dd | Dd | | | | | | |
| 25 | | Dd | Dd | Dd | Dd | Dd | Dd | | | | | | | |
| 26 | | Dd | Dd | Dd | Dd | Dd | | | | | | | | |
| 27 | | Dd | Dd | Dd | Dd | | | | | | | | | |
| 28 | | | Dd | Dd | Dd | Dd | Dd | Dd | Dd | Dd | Dd | Dd | Dd | Dd |
| 29 | | | Dd | Dd | Dd | Dd | Dd | Dd | Dd | Dd | Dd | Dd | | |
| 30 | | | Dd | Dd | Dd | Dd | Dd | Dd | Dd | Dd | | | | |
| 31 | | | Dd | Dd | Dd | Dd | Dd | Dd | Dd | | | | | |
| 32 | | | Dd | Dd | Dd | Dd | Dd | Dd | | | | | | |
| 33 | | | Dd | Dd | Dd | Dd | | | | | | | | |
| 34 | | | Dd | Dd | Dd | Dd | | | | | | | | |
| 35 | | | | Dd | | | Dd | | | Dd | | | | |
| 36 | | | | Dd | Dd | Dd | | | Dd | | | | | |
| 37 | | | | Dd | Dd | Dd | Dd | | | | | | | |
| 38 | | | | Dd | Dd | Dd | Dd | Dd | | | | | | |
| 39 | | | | Dd | Dd | Dd | Dd | Dd | Dd | | | | | |
| 40 | | | | Dd | Dd | Dd | Dd | Dd | Dd | Dd | | | | |
| 41 | | | | Dd | Dd | Dd | Dd | Dd | Dd | Dd | Dd | Dd | | |
| 42 | | | | | | Dd | Dd | | | | | | Dd | Dd |

TABLE 16-continued

| RA(i) | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 43 | | | | | | | | Dd | Dd | Dd | Dd | | | |
| 44 | | | | | | | | Dd | Dd | Dd | Dd | Dd | Dd | Dd |
| 45 | | | | | | | | Dd | Dd | Dd | Dd | Dd | Dd | Dd |
| 46 | | | | | | | | Dd | | | | | Dd | Dd |
| 47 | | | | | | | | Dd | | Dd | | | Dd | Dd |
| 48 | | | | | | | | | Dd | Dd | | | Dd | Dd |
| 49 | | | | | | | | | Dd | Dd | Dd | Dd | Dd | Dd |
| 50 | | | | | | | | | | Dd | Dd | Dd | Dd | Dd |
| 51 | | | | | | | | | | | Dd | Dd | Dd | Dd |
| 52 | | | | | | | | | | Dd | | | Dd | Dd |
| 53 | | | | | | | | | | | Dd | Dd | Dd | Dd |
| 54 | | | | | | | | | | | | | Dd | Dd |

Implementation six: SCS {SSB, RMSI}={120, 120} kHz

In a case where the subcarrier spacing (SCS) combination {SSB, RMSI}={120, 120} kHz, Table 17 shows mapping locations of SSBs in a slot, and possible locations of an RMSI search space (that is, Dc denotes a symbol where the RMSI search space is located in the slot). Based on this, time domain allocation patterns for an RMSI PDSCH in a case where there are some or all SSBs are further given. In the embodiment, the situation of search space location {1, 2, 4, 5, 7, 8} is the same as the resource allocation situation of corresponding search spaces in Tables 12 and 13, which is not repeated here.

In a case where the slot includes two search spaces, a second search space of the two search spaces is denoted in bold. SSB denotes a symbol onto which an SSB is mapped. Dd denotes a symbol occupied by the PDSCH. In a case where a slot contains two search spaces, a symbol in the second search space, occupied by the PDSCH and allocated by a PDCCH is denoted in bold.

TABLE 17

| Search Space Location | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| SSB in a First Slot | | | | | | | SSB0 | | | | SSB1 | | | |
| SSB in a Second Slot | | | | SSB2 | | | SSB3 | | | | | | | |
| 1 | | Dc | | | | | | | | | | | | |
| 2 | | Dc | Dc | | | | | | | | | | | |
| 4 | | Dc | Dc | | | | | | | | | | | |
| 5 | | Dc | Dc | Dc | Dc | | | | | | | | | |
| 7 | | | Dc | | | | | | | | | | | |
| 8 | | | Dc | Dc | | | | | | | | | | |
| 10 | | Dc | Dd | | SSB2 | | Dd | Dc | Dd | Dd | Dd | Dd | | |
| | | Dc | Dd | | SSB2 | | Dd | Dc | Dd | Dd | Dd | Dd | Dd | Dd |
| 11 | | Dc | Dc | | SSB2 | | Dd | Dc | Dc | Dd | Dd | Dd | Dd | Dd |
| 13 | | | | | SSB2 | | | Dc | Dd | Dd | Dd | Dd | | |
| | | | | | SSB2 | | | Dc | Dd | Dd | Dd | Dd | Dd | Dd |
| 14 | | | | | SSB2 | | | Dc | Dc | Dd | Dd | Dd | Dd | |
| | | | | | SSB2 | | | Dc | Dc | Dd | Dd | Dd | Dd | Dd |
| 10 | | Dc | Dd | Dd | Dd | Dd | Dd | Dd | Dc | | SSB1 | | Dd | Dd |
| | | Dc | Dd | Dd | Dd | Dd | Dd | Dd | Dc | | SSB1 | | Dd | Dd |

Possible time domain resource allocation patterns in a case where the slot RMSI located contains no SSB still refer to Table 5.

When labels of Dc symbols and SSB symbols in Tables 17 and 5 are hided and only labels of PDSCH symbols (that is, Dd) in Tables 17 and 5 are retained, each row in Tables 17 and 5 corresponds to a time domain resource allocation pattern. That is, a set of symbols labeled Dd in each row is defined as a time domain resource allocation pattern. Identical resource allocation patterns are merged and a time domain resource allocation table as shown in Table 18 is obtained. In a case where SCS combination {SSB, RMSI}={120, 120} kHz, there are 31 possible time domain resource allocation manners in total. Additionally, for search space allocation {1, 2, 4, 5, 7, 8}, the 31 possible time domain resource allocation manners and resource allocation situation of corresponding search spaces in Table 12 and Table 13 are combined together as a universal set of time domain resource allocation. Several time domain resource allocation manners may be selected from the universal set, and the time domain allocation is indicated by the corresponding number of bits in an RMSI PDCCH. For example, in the standard, the currently used time domain resource allocation for the PDSCH is indicated to a terminal by 6 bits, in which there are 10 reserved states. For another example, to reduce the bit overheads of the time domain resource allocation, in the standard, 16 manners among the universal set for time domain resource allocation are defined as default time domain resource allocation manners for the RMSI, and correspondingly, the currently used time domain resource allocation pattern for the PDSCH is indicated to the terminal by 4 bits.

TABLE 18

| RA(i) | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | Dd | | | | Dd | | | | | | | | |
| 1 | | Dd | | | | Dd | | Dd | Dd | | | | | |
| 2 | | Dd | Dd | Dd | Dd | | | | | | | | | |
| 3 | | Dd | Dd | Dd | Dd | Dd | Dd | | | | | | | |
| 4 | | | | | Dd | Dd | Dd | Dd | Dd | Dd | Dd | Dd | Dd | Dd |
| 5 | | | | | Dd | Dd | Dd | Dd | Dd | Dd | Dd | Dd | Dd | |
| 6 | | | | | Dd | Dd | Dd | Dd | Dd | Dd | Dd | Dd | | |
| 7 | | | | | Dd | Dd | Dd | Dd | Dd | Dd | Dd | | | |

TABLE 18-continued

| RA(i) | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 8 | | | Dd | Dd | Dd | Dd | Dd | Dd | | | | | | |
| 9 | | | Dd | Dd | Dd | Dd | Dd | | | | | | | |
| 10 | | | Dd | Dd | Dd | Dd | | | | | | | | |
| 11 | | | | | Dd | Dd | Dd | Dd | Dd | Dd | Dd | Dd | Dd | Dd |
| 12 | | | | | Dd | Dd | Dd | Dd | Dd | Dd | Dd | Dd | | |
| 13 | | | | | Dd | Dd | Dd | Dd | Dd | Dd | Dd | | | |
| 14 | | | | | Dd | Dd | Dd | Dd | Dd | Dd | | | | |
| 15 | | | | | Dd | Dd | Dd | Dd | Dd | | | | | |

TABLE 18-continued

| RA(i) | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 16 | | | | Dd | Dd | Dd | Dd | Dd | | | | | | |
| 17 | | | | Dd | Dd | Dd | Dd | | | | | | | |
| 18 | | | | | Dd | Dd | Dd | Dd | | | | | | |
| 19 | | | | | Dd | Dd | Dd | Dd | Dd | | | | | |
| 20 | | | | | Dd | Dd | Dd | Dd | Dd | Dd | Dd | | | |
| 21 | | | | | Dd | Dd | Dd | Dd | Dd | Dd | Dd | Dd | | |
| 22 | | | | | Dd | Dd | Dd | Dd | Dd | Dd | Dd | Dd | Dd | Dd |
| 23 | | | | | | Dd | Dd | Dd | Dd | | | | | |
| 24 | | | | | | Dd | Dd | Dd | Dd | Dd | Dd | Dd | | |
| 25 | | | | | | Dd | Dd | Dd | Dd | Dd | Dd | Dd | Dd | |
| 26 | | | | | | | | Dd | Dd | Dd | Dd | Dd | Dd | |
| 27 | | | | | | | | Dd | Dd | Dd | Dd | | | |
| 28 | | | | | | | | | Dd | Dd | Dd | Dd | Dd | |
| 29 | | | | | | | | | | Dd | Dd | Dd | Dd | |
| 30 | | | | | | | | | | | | Dd | Dd | |

Implementation seven: SCS {SSB, RMSI}={240, 60} kHz

In a case where the subcarrier spacing (SCS) combination {SSB, RMSI}={240, 60} kHz, Table 19 shows mapping locations of SSBs in a slot, and possible locations of an RMSI search space (that is, Dc denotes a symbol where the RMSI search space is located in the slot). Based on this, Table 19 shows time domain allocation patterns for an RMSI PDSCH in a case where there are some or all SSBs.

In this case, an RMSI slot contains 8 SSBs. To simplify the number of possible time domain allocation patterns, it is assumed that actual sending states for four consecutive SSBs (that is, SSBs 0 to 3, or SSBs 4 to 7) are the same. In a case a certain SSB among SSBs 0 to 3 is actually sent, when a base station allocates a time domain resource for the RMSI PDSCH, it is regarded that all of SSBs 0 to 3 are sent. It is the same for SSBs 4 to 7. As shown in Table 19, different time domain allocation patterns are given. In the case where the slot includes two search spaces, a second search space of the two search spaces is denoted in bold. SSB denotes a symbol onto which an SSB is mapped. Dd denotes a symbol occupied by the PDSCH. In a case where a slot contains two search spaces, a symbol in the second search space, occupied by the PDSCH and allocated by a PDCCH is denoted in bold.

TABLE 19

| Search Space Location Index | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| SSB | | | SSB0 | SSB1 | SSB2 | SSB3 | | | SSB4 | SSB5 | SSB6 | SSB7 | | |
| 1, 2, 7 | | Dc | SSB0 | SSB1 | SSB2 | SSB3 | Dd | Dd | Dd | Dd | | | | |
| | | Dc | SSB0 | SSB1 | SSB2 | SSB3 | Dd | Dd | Dd | Dd | Dd | Dd | Dd | |
| 4 | | Dc | Dc | SSB0 | SSB1 | SSB2 | SSB3 | Dd | Dd | Dd | Dd | Dd | Dd | Dd | Dd |
| 10 | | Dc | Dd | SSB0 | SSB1 | SSB2 | SSB3 | Dd | Dc | Dd | Dd | Dd | Dd | Dd | Dd |
| 13 | | | | SSB0 | SSB1 | SSB2 | SSB3 | Dc | Dd | Dd | Dd | Dd | | |
| 14 | | | | SSB0 | SSB1 | SSB2 | SSB3 | Dc | Dc | Dd | Dd | Dd | Dd | |
| 1, 2, 7 | | Dc | Dc | Dd | Dd | Dd | Dd | Dd | Dd | SSB4 | SSB5 | SSB6 | SSB7 | |
| 4 | | Dc | Dc | Dd | Dd | Dd | Dd | Dd | Dd | SSB4 | SSB5 | SSB6 | SSB7 | Dd | Dd |
| 8 | | | Dc | Dc | Dd | Dd | Dd | Dd | Dd | SSB4 | SSB5 | SSB6 | SSB7 | | |
| 10 | | Dc | Dd | Dd | Dd | Dd | Dd | Dc | SSB4 | SSB5 | SSB6 | SSB7 | Dd | Dd |
| 1, 2, 7 | | Dc | Dc | SSB0 | SSB1 | SSB2 | SSB3 | Dd | Dd | SSB4 | SSB5 | SSB6 | SSB7 | Dd | Dd |

When labels of Dc symbols and SSB symbols in Tables 19 and 5 are hided and only labels of PDSCH symbols (that is, Dd) in Tables 19 and 5 are retained, each row in Tables 19 and 5 corresponds to a time domain resource allocation pattern. That is, a set of symbols labeled Dd in each row is defined as a time domain resource allocation pattern. Identical resource allocation patterns are merged and a time domain resource allocation table as shown in Table 20 is obtained. In the case where SCS combination {SSB, RMSI}={240, 60} kHz, there are 32 possible time domain resource allocation manners in total, which served as a universal set of time domain resource allocation. Several time domain resource allocation manners may be selected from the universal set, and the time domain allocation is indicated by the corresponding number of bits in an RMSI PDCCH. For example, in the standard, the currently used time domain resource allocation for the PDSCH is indicated to a terminal by 5 bits, and a correspondence between various time domain resource allocation manners and values of the indication bits is defined. For another example, to reduce the bit overheads of the time domain resource allocation, in the standard, 16 manners among the 32 time domain resource allocation manners are defined as default time domain resource allocation manners for the RMSI, a correspondence between various time domain resource allocation manners and values of the indication bits is defined, and correspondingly, the currently used time domain resource allocation pattern for the PDSCH is indicated to the terminal by 4 bits.

TABLE 20

| RA(i) | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 1 | | Dd | | | | Dd | | Dd | Dd | | | | | |
| 2 | | Dd | Dd | Dd | Dd | | | | | | | | | |
| 3 | | | Dd | Dd | Dd | Dd | Dd | Dd | Dd | Dd | Dd | Dd | Dd | |
| 4 | | | Dd | Dd | Dd | Dd | Dd | Dd | Dd | Dd | Dd | | | |
| 5 | | | Dd | Dd | Dd | Dd | Dd | Dd | Dd | Dd | | | | |
| 6 | | | Dd | Dd | Dd | Dd | Dd | Dd | Dd | | | | | |
| 7 | | | Dd | Dd | Dd | Dd | Dd | Dd | | | | | | |
| 8 | | | Dd | Dd | Dd | Dd | Dd | | | | | | | |
| 9 | | | Dd | Dd | Dd | Dd | | | | | | | | |
| 10 | | | | Dd | Dd | Dd | Dd | Dd | Dd | Dd | Dd | Dd | Dd | |
| 11 | | | | Dd | Dd | Dd | Dd | Dd | Dd | Dd | Dd | | | |
| 12 | | | | Dd | Dd | Dd | Dd | Dd | Dd | Dd | | | | |
| 13 | | | | Dd | Dd | Dd | Dd | Dd | Dd | | | | | |
| 14 | | | | Dd | Dd | Dd | Dd | Dd | | | | | | |
| 15 | | | | Dd | Dd | Dd | Dd | | | | | | | |
| 16 | | | | Dd | Dd | Dd | Dd | | | | | | | |
| 17 | | | | | Dd | Dd | Dd | Dd | | | | | | |
| 18 | | | | | Dd | Dd | Dd | Dd | Dd | | | | | |
| 19 | | | | | Dd | Dd | Dd | Dd | Dd | Dd | | | | |
| 20 | | | | | Dd | Dd | Dd | Dd | Dd | Dd | Dd | | | |
| 21 | | | | | Dd | Dd | Dd | Dd | Dd | Dd | Dd | Dd | Dd | |

TABLE 20-continued

| RA(i) | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 22 | | | | | Dd | Dd | | | | | | | Dd | Dd |
| 23 | | | | | | Dd | Dd | Dd | Dd | | | | | |
| 24 | | | | | | Dd | Dd | Dd | Dd | Dd | Dd | Dd | | |
| 25 | | | | | | Dd | Dd | Dd | Dd | Dd | Dd | Dd | Dd | |
| 26 | | | | | | Dd | Dd | | | | | | Dd | Dd |
| 27 | | | | | | | | Dd | Dd | Dd | Dd | Dd | | |
| 28 | | | | | | | | Dd | Dd | Dd | Dd | | | |
| 29 | | | | | | | | | Dd | Dd | Dd | Dd | Dd | |
| 30 | | | | | | | | | Dd | Dd | Dd | Dd | | |
| 31 | | | | | | | | | | Dd | Dd | Dd | Dd | |
| 32 | | | | | | | | | | | | | Dd | Dd |

Implementation eight: SCS {SSB, RMSI}={240, 120} kHz

In the case where the subcarrier spacing (SCS) combination {SSB, RMSI}={240, 120} kHz, Table 21 shows mapping locations of SSBs in a slot, and possible locations of an RMSI search space (that is, Dc denotes a symbol where the RMSI search space is located in the slot). Based on this, time domain allocation patterns for an RMSI PDSCH in a case where there are some or all SSBs are further given.

In a case where the slot includes two search spaces, a second search space of the two search spaces is denoted in bold. SSB denotes a symbol onto which an SSB is mapped. Dd denotes a symbol occupied by the PDSCH. In a case where a slot contains two search spaces, a symbol in the second search space, occupied by the PDSCH and allocated by a PDCCH is denoted in bold.

TABLE 21

| Search Space Location Index | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| SSB in Even Slot | | | | | SSB0 | | SSB1 | | SSB2 | | SSB3 | | | |
| SSB in Odd Slot | | | SSB4 | | SSB5 | | SSB6 | | SSB7 | | | | | |
| 1, 2, 7 | Dc | Dc | SSB4 | Dd | Dd | Dd | Dd | | | | | | | |
| | Dc | Dc | SSB4 | Dd | Dd | Dd | Dd | Dd | Dd | Dd | | | | |
| 4 | Dc | Dc | SSB4 | Dd | Dd | Dd | Dd | Dd | Dd | Dd | Dd | | | |
| 10 | Dc | Dd | SSB4 | Dd | Dd | Dd | Dc | Dd | Dd | Dd | Dd | | | |
| 11 | Dc | Dc | SSB4 | Dd | Dd | Dd | Dc | Dc | Dd | Dd | Dd | Dd | Dd | |
| 13 | | | SSB4 | | | | Dc | Dd | Dd | Dd | Dd | | | |
| 14 | | | SSB4 | | | | Dc | Dc | Dd | Dd | Dd | Dd | | |
| 1, 2, 7 | Dc | Dc | | | SSB0/SSB5 | Dd | Dd | Dd | Dd | | | | | |
| | Dc | Dc | | | SSB0/SSB5 | Dd | Dd | Dd | Dd | Dd | Dd | | | |
| | Dc | Dc | Dd | Dd | SSB0/SSB5 | Dd | Dd | | | | | | | |
| 4 | Dc | Dc | Dd | Dd | SSB0/SSB5 | Dd | Dd | Dd | Dd | Dd | Dd | | | |
| 5 | Dc | Dc | Dc | Dc | SSB0/SSB5 | Dd | Dd | Dd | Dd | Dd | Dd | | | |
| 8 | | | Dc | Dc | SSB0/SSB5 | Dd | Dd | Dd | Dd | | | | | |
| | | | Dc | Dc | SSB0/SSB5 | Dd | Dd | Dd | Dd | Dd | Dd | | | |
| 10 | Dc | Dd | Dd | Dd | SSB0/SSB5 | Dd | Dc | Dd | Dd | Dd | Dd | | | |
| 11 | Dc | Dc | Dd | Dd | SSB0/SSB5 | Dd | Dc | Dc | Dd | Dd | Dd | Dd | | |
| 13 | | | | | SSB0/SSB5 | | Dc | Dd | Dd | Dd | Dd | | | |
| 14 | | | | | SSB0/SSB5 | | Dc | Dc | Dd | Dd | Dd | Dd | | |
| 1, 2, 7 | Dc | Dc | Dd | Dd | Dd | Dd | SSB1/SSB6 | | | | | | | |
| 4 | Dc | Dc | Dd | Dd | Dd | Dd | SSB1/SSB6 | Dd | Dd | Dd | Dd | | | |
| 5 | Dc | Dc | Dc | Dc | Dd | Dd | SSB1/SSB6 | Dd | Dd | Dd | Dd | Dd | | |
| 8 | | | Dc | Dc | Dd | Dd | SSB1/SSB6 | Dd | Dd | | | | | |
| 1, 2, 7 | Dc | Dc | Dd | Dd | Dd | Dd | Dd | Dd | SSB2/SSB7 | | | | | |
| 4 | Dc | Dc | Dd | Dd | Dd | Dd | Dd | Dd | SSB2/SSB7 | Dd | Dd | Dd | Dd | |
| 5 | Dc | Dc | Dc | Dc | Dd | Dd | Dd | Dd | SSB2/SSB7 | Dd | Dd | Dd | Dd | |
| 8 | | | Dc | Dc | Dd | Dd | Dd | Dd | SSB2/SSB7 | | | | | |
| 10 | Dc | Dd | Dd | Dd | Dd | Dd | Dd | Dc | SSB2/SSB7 | Dd | Dd | Dd | Dd | |
| 13 | | | | | | | | Dc | SSB2/SSB7 | Dd | Dd | Dd | Dd | |
| 1, 2, 7 | Dc | Dc | Dd | Dd | Dd | Dd | Dd | Dd | Dd | Dd | SSB3 | | | |
| 4 | Dc | Dc | Dd | Dd | Dd | Dd | Dd | Dd | Dd | | SSB3 | | | |
| 8 | | | Dc | Dc | Dd | Dd | Dd | Dd | Dd | | SSB3 | | | |

TABLE 21-continued

| Search Space Location Index | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 10 | Dc | Dd | Dd | Dd | Dd | Dd | Dd | Dc | Dd | Dd | SSB3 | | Dd | Dd |
| 11 | Dc | Dc | Dd | Dd | Dd | Dd | Dd | Dc | Dc | Dd | SSB3 | | Dd | Dd |
| 13 | | | | | | | | Dc | Dd | Dd | SSB3 | | Dd | Dd |
| 14 | | | | | | | | Dd | Dc | Dc | Dd | SSB3 | Dd | Dd |

When labels of Dc symbols and SSB symbols in Tables 21 and 5 are hided and only labels of PDSCH symbols (that is, Dd) in Tables 21 and 5 are retained, each row in Tables 21 and 5 corresponds to a time domain resource allocation pattern. That is, a set of symbols labeled Dd in each row is defined as a time domain resource allocation pattern. Identical resource allocation patterns are merged and a time domain resource allocation table as Table 22 is obtained. In the case where SCS combination {SSB, RMSI}={240, 120} kHz, there are 39 possible time domain resource allocation manners in total, which served as a universal set of time domain resource allocation. Several time domain resource allocation manners may be selected from the universal set, and the time domain allocation pattern is indicated by the corresponding number of bits in an RMSI PDCCH. For example, in the standard, the currently used time domain resource allocation pattern for the PDSCH is indicated to a terminal by 5 bits. 32 time domain resource allocation manners are selected from among the 39 time domain resource allocation manners, and a correspondence between various time domain resource allocation manners and values of the indication bits is defined. For another example, to reduce the bit overheads of the time domain resource allocation, in the standard, 16 manners among the 39 time domain resource allocation manners are defined as default time domain resource allocation manners for the RMSI, a correspondence between various time domain resource allocation manners and values of the indication bits is defined, and correspondingly, the currently used time domain resource allocation pattern for the PDSCH is indicated to the terminal by 4 bits.

TABLE 22

| RA(i) | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 1 | Dd | | | Dd | Dd | Dd | | | | | | | | |
| 2 | Dd | Dd | Dd | | | Dd | | | | | | | | |
| 3 | Dd | Dd | Dd | Dd | Dd | Dd | | | | | | | | |
| 4 | | Dd | Dd | | | Dd | | Dd | | | | | | |
| 5 | | Dd | Dd | Dd | Dd | Dd | Dd | Dd | Dd | Dd | Dd | Dd | Dd | |
| 6 | | Dd | Dd | Dd | Dd | Dd | Dd | Dd | Dd | Dd | Dd | | | |
| 7 | | Dd | Dd | Dd | Dd | Dd | Dd | Dd | Dd | | | | | |
| 8 | | Dd | Dd | Dd | Dd | Dd | Dd | Dd | | | | | | |
| 9 | | Dd | Dd | Dd | Dd | Dd | Dd | | | | | | | |
| 10 | | Dd | Dd | Dd | Dd | Dd | | | | | | | | |
| 11 | | Dd | Dd | Dd | Dd | | | | | | | | | |
| 12 | | | Dd | Dd | Dd | Dd | Dd | Dd | Dd | Dd | Dd | Dd | | |
| 13 | | | Dd | Dd | Dd | Dd | Dd | Dd | Dd | Dd | Dd | | | |
| 14 | | | Dd | Dd | Dd | Dd | Dd | Dd | Dd | Dd | | | | |
| 15 | | | Dd | Dd | Dd | Dd | Dd | Dd | Dd | | | | | |
| 16 | | | Dd | Dd | Dd | Dd | Dd | Dd | | | | | | |
| 17 | | | Dd | Dd | Dd | Dd | Dd | | | | | | | |
| 18 | | | Dd | Dd | Dd | Dd | | | | | | | | |
| 19 | | | | Dd | Dd | | | Dd | Dd | | | | | |
| 20 | | | | Dd | Dd | Dd | | | Dd | | | | | |
| 21 | | | | Dd | Dd | Dd | Dd | | | | | | | |
| 22 | | | | Dd | Dd | Dd | Dd | Dd | | | | | | |
| 23 | | | | Dd | Dd | Dd | Dd | Dd | Dd | Dd | | | | |
| 24 | | | | Dd | Dd | Dd | Dd | Dd | Dd | Dd | Dd | | | |
| 25 | | | | Dd | Dd | Dd | Dd | Dd | Dd | Dd | Dd | Dd | Dd | |
| 26 | | | | | Dd | Dd | Dd | Dd | | | | | | |
| 27 | | | | | Dd | Dd | Dd | Dd | | | | | | |
| 28 | | | | | Dd | Dd | Dd | Dd | Dd | Dd | Dd | | | |
| 29 | | | | | Dd | Dd | Dd | Dd | Dd | Dd | Dd | Dd | | |
| 30 | | | | | Dd | Dd | | | | | | | | |
| 31 | | | | | Dd | Dd | | | | | | Dd | Dd | |
| 32 | | | | | Dd | | | Dd | | | | Dd | Dd | |
| 33 | | | | | | | Dd | Dd | Dd | Dd | Dd | Dd | | |
| 34 | | | | | | | Dd | Dd | | | | Dd | Dd | |
| 35 | | | | | | | Dd | Dd | Dd | Dd | | | | |
| 36 | | | | | | | | Dd | Dd | Dd | Dd | Dd | | |
| 37 | | | | | | | | Dd | Dd | Dd | Dd | | | |
| 38 | | | | | | | | | Dd | Dd | Dd | Dd | | |
| 39 | | | | | | | | | | | | | Dd | Dd |

Implementation Nine

For transmission for a second signal channel and downlink control information corresponding to the second signal channel, one or more physical downlink control channel monitoring windows (PDCCH monitoring windows) are configured at a network side. Different monitoring windows are associated with different SSBs. A terminal determines, in response to an SSB reception, the location of a monitoring window that corresponds to this SSB and carries the second channel signal. The second channel signal includes at least one of a physical downlink shared channel (PDSCH) carrying remaining minimum system information (RMSI), a PDSCH carrying paging information, a PDSCH carrying other system information (OSI), a PDSCH carrying random access response information, a PDSCH carrying random access collision resolution information, a PDSCH carrying MSG2, or a PDSCH carrying MSG4.

The terminal detects the downlink control information (DCI) corresponding to the second channel signal within the configured monitoring window according to a search space configuration. The monitoring window includes one or more slots. In a case where the monitoring window contains multiple slots, different monitoring windows may overlap each other. In this case, the monitoring window may contain multiple second channel signals (corresponding to different SSBs). A second channel signal having a quasi-co-location (QCL) relationship with the SSB detected by the terminal has higher detection performance, however, second channel signals corresponding to other SSBs may be firstly detected in monitoring windows by the terminal. Even if the reception is successful, the access is not successful. Therefore, for the terminal, it cannot be assumed that only one second channel signal is transmitted in the multiple slots within one monitoring window. That is, the terminal needs to detect the downlink control information of the second channel signal in the one or more slots within the monitoring window corresponding to the second channel signal.

Specifically, in the cases described below in the subsequent process, the terminal needs to continue to detect the downlink control information of the second channel signal in other slots within the monitoring window.

Subexample 1: in a case where the terminal correctly detects the downlink control information of the second channel signal in a certain slot within the monitoring window, but does not correctly detect the second channel signal, the downlink control information of the second channel signal correctly detected by the terminal may not be the transmission in a beam direction or at a downlink port to which the terminal belongs (that is, the downlink control information successfully received does not have a quasi-co-location (QCL) relationship with the SSB previously detected by the terminal, but is just successfully received by the terminal due to the overlap of monitoring windows). Thus, the terminal needs to continue to detect the downlink control information of the second channel signal in other time slots within the monitoring window.

Subexample 2: in a case where the terminal correctly detects not only downlink control information of RMSI, but also the RMSI, and performs preamble transmission according to random access configuration in the RMSI, but cannot correctly detect random access response information, the possible reason of this case is that the RMSI received by the terminal does not have a quasi-co-location (QCL) relationship with the SSB previously detected by the terminal. That is, the received RMSI is not the target RMSI to be received by the terminal, and a random access request (preamble) sent according to the configuration in this detected RMSI is incorrect, so a base station does not reply corresponding random access response information. Thus, the terminal continues to detect the downlink control information of the RMSI in other slots within the monitoring window corresponding to the first channel signal, and determines a subsequent random access request and reception configuration based on new reception.

In the present application, the features of the various embodiments, if not in collision, may be combined with each other into one embodiment for use. Each embodiment is merely an optimal implementation mode of the present application, The embodiment provides a time domain resource allocation method and system. A time domain resource allocation solution that does not conflict with synchronization signal block transmission resources is obtained in view of mapping patterns from synchronization signal blocks to slots in different subcarrier spacing combinations.

The solution in the embodiment avoids resource allocation limits to an RMSI PDSCH caused by the existing time domain resource allocation mode where a PDSCH is only supported to occupy several consecutive symbols in a slot, thereby the efficiency and flexibility of resource allocation is improved. Additionally, time domain resource allocation lists are defined for different subcarrier spacing combinations, greatly reducing the overheads of the time domain resource allocation, and effectively supporting the time domain resource allocation for the RMSI PDSCH.

Embodiment Four

The embodiment of the present disclosure further provides a storage medium. The storage medium stores a computer program. The steps in any method embodiment described above are performed when the computer program is executed.

Optionally, the storage medium may be configured to store a computer program for performing the steps described below.

In step S1, a time domain resource allocation pattern set is determined. The time domain resource allocation pattern set includes at least one of a time domain resource allocation pattern set corresponding to a combination of a first subcarrier spacing (SCS) and a second SCS, where the first SCS is an SCS of a first channel signal, and the second SCS is an SCS of a second channel signal; a time domain resource allocation pattern set indicated by downlink control information (DCI) signaling; or a time domain resource allocation pattern set corresponding to a slot type. A time domain resource allocation pattern in the time domain resource allocation pattern set is used to indicate symbols occupied by the second channel signal.

In the embodiment, the storage medium may include, but is not limited to, a USB disk, a read-only memory (ROM), a random access memory (RAM), a mobile hard disk, a magnetic disk, an optical disk, or other medium capable of storing the computer program.

The embodiment of the present disclosure further provides an electronic device. The electronic device includes a memory and a processor. The memory stores a computer program. The processor is configured to execute the computer program to perform the steps in any one of the method embodiments described above.

Optionally, the electronic device may further include a transmission device and an input and output device. The transmission device is connected to the processor. The input and output device is connected to the processor.

Optionally, in the embodiment, the processor may be configured to perform the steps below through a computer program.

In step S1, a time domain resource allocation pattern set is determined. The time domain resource allocation pattern set includes at least one of a time domain resource allocation pattern set corresponding to a combination of a first subcarrier spacing (SCS) and a second SCS, where the first SCS is an SCS of a first channel signal, and the second SCS is an SCS of a second channel signal; a time domain resource allocation pattern set indicated by downlink control information (DCI) signaling; or a time domain resource allocation pattern set corresponding to a slot type. A time domain resource allocation pattern in the time domain resource allocation pattern set is used to indicate symbols occupied by the second channel signal.

Optionally, specific examples in the embodiment may refer to the examples described in the embodiments and optional implementations described above, which are not repeated here.

Apparently, it is to be understood by those skilled in the art that each of the modules or steps of the present disclosure may be implemented by a general-purpose computing device. The modules or steps may be concentrated on a single computing device or distributed on a network composed of multiple computing devices. Optionally, the various modules or various steps described above may be implemented by program codes executable by the computing device, so that the various modules or various steps described above may be stored in a storage device to be executed by the computing device. In some circumstances, the illustrated or described steps may be executed in sequences different from those described herein. Alternatively, the various modules or various steps described above may be separately made into various integrated circuit modules, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure. For those skilled in the art, the present disclosure may have various modifications and variations. Any modifications, equivalent substitutions, improvements and the like made in the spirit and principles of the present disclosure are within the scope of the present disclosure.

We claim:

1. A time domain resource determination method for a terminal, comprising:
  determining a time domain resource allocation pattern set according to a radio resource control (RRC) signaling and a combination of a first subcarrier spacing (SCS) and a second SCS, wherein the first SCS is a SCS of a first channel signal, and the second SCS is a SCS of a second channel signal;
  determining a time domain resource allocation pattern in the time domain resource allocation pattern set according to the indication of a downlink control information (DCI) signaling;
  determining, according to the time domain resource allocation pattern in the time domain resource allocation pattern set, symbols occupied by the second channel signal; and
  receiving the second channel signal on the symbols,
  wherein determining the time domain resource allocation pattern set according to RRC signaling and the combination of the first SCS and the second SCS comprises: determining, according to a predefined correspondence between the time domain resource allocation pattern set and the combination of the first SCS and the second SCS, the time domain resource allocation pattern set corresponding to the combination of the first SCS and the second SCS.

2. The method of claim 1, wherein the time domain resource allocation pattern set comprises at least a slot containing the first channel signal.

3. The method of claim 1, wherein the time domain resource allocation pattern set comprises a slot not containing the first channel signal.

4. The method of claim 1, wherein the correspondence between the time domain resource allocation pattern set and the combination of the first SCS and the second SCS comprises: a combination of the first SCS and the second SCS corresponding to a plurality of time domain resource allocation pattern sets.

5. The method of claim 1, wherein the symbols occupied by the second channel signal comprise consecutive P symbols, wherein P is an integer satisfying 0<P≤14.

6. The method of claim 1, wherein the first channel signal comprises a synchronization signal physical broadcast channel block (SSB); and the second channel signal comprises a physical downlink shared channel (PDSCH) carrying remaining minimum system information (RMSI).

7. The method of claim 1, wherein the combination of the first SCS and the second SCS comprises at least one of:
  {15, 15} kHz, {15, 30} kHz, {30, 15} kHz, {30, 30} kHz, {120, 60} kHz, {120, 120} kHz, {240, 60} kHz, or {240, 120} kHz.

8. A time domain resource determination apparatus, comprising a processor, the processor being configured to:
  determine a time domain resource allocation pattern set according to a radio resource control (RRC) signaling and a combination of a first subcarrier spacing (SCS) and a second SCS, wherein the first SCS is a SCS of a first channel signal, and the second SCS is a SCS of a second channel signal determine according to a time domain resource allocation pattern in the time domain resource allocation pattern set, symbols occupied by the second channel signal;
  determine according to the time domain resource allocation pattern in the time domain resource allocation pattern set, symbols occupied by the second channel signal; and
  wherein the processor is further configured to receive the second channel signal on the symbols,
  wherein determining the time domain resource allocation pattern set according to RRC signaling and the combination of the first SCS and the second SCS comprises: determining, according to a predefined correspondence between the time domain resource allocation pattern set and the combination of the first SCS and the second SCS, the time domain resource allocation pattern set corresponding to the combination of the first SCS and the second SCS.

9. The apparatus of claim 8, wherein the time domain resource allocation pattern set comprises at least a slot containing the first channel signal.

10. The apparatus of claim 8, wherein the time domain resource allocation pattern set comprises a slot not containing the first channel signal.

11. The apparatus of claim 8, wherein the correspondence between the time domain resource allocation pattern set and the combination of the first SCS and the second SCS comprises: a combination of the first SCS and the second SCS corresponding to a plurality of time domain resource allocation pattern sets.

12. The apparatus of claim 8, wherein the symbols occupied by the second channel signal comprise:
  consecutive P symbols, wherein P is an integer satisfying 0<P≤14.

13. The apparatus of claim 8, wherein the first channel signal comprises a synchronization signal physical broadcast channel block (SSB); and the second channel signal comprises a physical downlink shared channel (PDSCH) carrying remaining minimum system information (RMSI).

14. The apparatus of claim 8, wherein the combination of the first SCS and the second SCS comprises at least one of:
  {15, 15} kHz, {15, 30} kHz, {30, 15} kHz, {30, 30} kHz, {120, 60} kHz, {120, 120} kHz, {240, 60} kHz, or {240, 120} kHz.

15. A non-transitory storage medium, which stores a computer program, wherein the computer program is configured to, when executed,
  determine a time domain resource allocation pattern set according to a radio resource control (RRC) signaling and a combination of a first subcarrier spacing (SCS) and a second SCS, wherein the first SCS is a SCS of a first channel signal, and the second SCS is a SCS of a second channel signal;
  determine a time domain resource allocation pattern in the time domain resource allocation pattern set according to the indication of a downlink control information (DCI) signaling;
  determine, according to the time domain resource allocation pattern in the time domain resource allocation pattern set, symbols occupied by the second channel signal; and
  receive the second channel signal on the symbols, wherein determining the time domain resource allocation pattern set according to RRC signaling and the combination of the first SCS and the second SCS comprises: determining, according to a predefined correspondence between the time domain resource allocation pattern set and the combination of the first SCS and the second SCS, the time domain resource allocation pattern set corresponding to the combination of the first SCS and the second SCS.

* * * * *

UNITED STATES PATENT AND TRADEMARK OFFICE
CERTIFICATE OF CORRECTION

| | |
|---|---|
| PATENT NO. | : 11,696,294 B2 |
| APPLICATION NO. | : 17/062064 |
| DATED | : July 4, 2023 |
| INVENTOR(S) | : Xing Liu et al. |

It is certified that error appears in the above-identified patent and that said Letters Patent is hereby corrected as shown below:

In the Claims

In Claim 1, Column 43, Line 24, please delete "according to RRC" and insert -- according to the RRC --

In Claim 2, Column 43, Line 33, please delete "at least a" and insert -- at least one --

In Claim 8, Column 43, Lines 64-67, please delete "second channel signal determine according to a time domain resource allocation pattern in the time domain resource allocation pattern set, symbols occupied by the second channel signal" and insert -- second channel signal --

In Claim 8, Column 44, Line 1, please delete "the time domain" and insert -- a time domain --

In Claim 8, Column 44, Line 8, please delete "pattern set according to RRC" and insert -- pattern set according to the RRC --

In Claim 9, Column 44, Line 18, please delete "at least a slot" and insert -- at least one slot --

Signed and Sealed this
Fourteenth Day of November, 2023

Katherine Kelly Vidal
*Director of the United States Patent and Trademark Office*